(12) United States Patent
VanSickler et al.

(10) Patent No.: US 11,754,582 B2
(45) Date of Patent: Sep. 12, 2023

(54) AUTOMATED DIAGNOSTIC ANALYZER AND METHOD FOR ITS OPERATION

(71) Applicant: BECTON DICKINSON AND COMPANY, Franklin Lakes, NJ (US)

(72) Inventors: Michael T. VanSickler, Columbia, MD (US); Neil G. Terry, Baltimore, MD (US); Brian Bell, Forest Hill, MD (US); Steven C. Rotundo, Baltimore, MD (US); Stephen Robert LaChance, Cockeysville, MD (US); Alyssa Shedlosky, Reisterstown, MD (US)

(73) Assignee: BECTON DICKINSON AND COMPANY, Franklin Lakes, NJ (US)

( * ) Notice: Subject to any disclaimer, the term of this patent is extended or adjusted under 35 U.S.C. 154(b) by 0 days.

(21) Appl. No.: 17/523,462

(22) Filed: Nov. 10, 2021

(65) Prior Publication Data
US 2022/0146545 A1 May 12, 2022

Related U.S. Application Data

(62) Division of application No. 16/088,939, filed as application No. PCT/US2017/018298 on Feb. 17, 2017, now Pat. No. 11,199,560.
(Continued)

(51) Int. Cl.
*B01L 3/00* (2006.01)
*B01L 9/06* (2006.01)
(Continued)

(52) U.S. Cl.
CPC ...... *G01N 35/1079* (2013.01); *B01L 3/50855* (2013.01); *B01L 9/06* (2013.01);
(Continued)

(58) Field of Classification Search
CPC ........... G01N 35/1079; G01N 35/0099; G01N 35/02; G01N 35/1002; G01N 35/1011;
(Continued)

(56) References Cited

U.S. PATENT DOCUMENTS

| 4,675,299 A * | 6/1987 | Witty | G01N 33/5304 D24/223 |
| 5,262,049 A | 11/1993 | Ferkany | |

(Continued)

FOREIGN PATENT DOCUMENTS

| CN | 102141572 A | 8/2011 |
| CN | 203178289 U | 9/2013 |

(Continued)

OTHER PUBLICATIONS

How to Use MicroAmp(TM) Reaction Plates, Tube Strips, and Tubes, Aug. 17, 2015, Thermo Fisher Scientific, pp. 1-8 (Year: 2015).*

(Continued)

*Primary Examiner* — Jill A Warden
*Assistant Examiner* — John McGuirk
(74) *Attorney, Agent, or Firm* — Botos Churchill IP Law LLP

(57) ABSTRACT

An automated analyzer that receives samples prepared for analysis in an automated pre-analytical module and a method of operation of such automated analyzer. The automated analyzer includes a shuttle transfer station that receives a shuttle carrier from the automated pre-analytical system. The shuttle transfer station has a clamping assembly for the shuttle. The clamping assembly has jaws that advance engagement members into contact with a bottom portion of sample containers disposed in the shuttle. The clamping assembly secures the sample containers in the shuttle when sample is aspirated from the sample containers.

(Continued)

The automated analyzer also has a multichannel puncture tool that is adapted to be carried by a robotic gripper mechanism. The multichannel puncture tool has multiple puncture members that each defines a channel Each channel is in communication with a different trough in the consumable. A pipette can pass through the channel in the puncture tool.

8 Claims, 24 Drawing Sheets

Related U.S. Application Data

(60) Provisional application No. 62/326,395, filed on Apr. 22, 2016.

(51) Int. Cl.
*G01N 35/10* (2006.01)
*B25J 9/02* (2006.01)
*B25J 15/00* (2006.01)
*B25J 15/08* (2006.01)
*B25J 19/00* (2006.01)
*G01N 35/00* (2006.01)
*G01N 35/02* (2006.01)

(52) U.S. Cl.
CPC ........... *B25J 9/026* (2013.01); *B25J 15/0066* (2013.01); *B25J 15/08* (2013.01); *B25J 19/0025* (2013.01); *G01N 35/0099* (2013.01); *G01N 35/02* (2013.01); *G01N 35/1002* (2013.01); *G01N 35/1011* (2013.01); *B01L 2300/021* (2013.01); *B01L 2300/044* (2013.01); *B01L 2300/06* (2013.01); *B01L 2300/0609* (2013.01); *B01L 2300/0858* (2013.01)

(58) Field of Classification Search
CPC .. B01L 3/50855; B01L 9/06; B01L 2300/021; B01L 2300/044; B01L 2300/06; B01L 2300/0609; B01L 2300/0858; B25J 9/026; B25J 15/0066; B25J 15/08; B25J 19/0025
See application file for complete search history.

(56) References Cited

U.S. PATENT DOCUMENTS

| | | |
|---|---|---|
| 5,772,962 A | 6/1998 | Hiroyasu et al. |
| 5,876,668 A | 3/1999 | Kawashima et al. |
| 5,985,215 A | 11/1999 | Sakazume et al. |
| 6,027,691 A | 2/2000 | Watts et al. |
| 6,138,521 A | 10/2000 | Basch et al. |
| 6,146,592 A | 11/2000 | Kawashima et al. |
| 6,162,399 A | 12/2000 | Martinell |
| 6,253,807 B1 | 7/2001 | Jones |
| 6,261,521 B1 | 7/2001 | Mimura et al. |
| 6,267,927 B1 | 7/2001 | Longedo et al. |
| 6,290,907 B1 | 9/2001 | Takahashi et al. |
| 6,293,750 B1 | 9/2001 | Cohen et al. |
| 6,335,166 B1 | 1/2002 | Ammann et al. |
| 6,521,183 B1 | 2/2003 | Burri et al. |
| 6,551,833 B1 | 4/2003 | Lehtinen et al. |
| 6,588,625 B2 | 7/2003 | Luoma, II et al. |
| 6,599,749 B1 | 7/2003 | Kodama |
| 6,635,488 B1 | 10/2003 | Saito |
| 6,723,288 B2 | 4/2004 | Devlin, Sr. et al. |
| 6,730,517 B1 | 5/2004 | Köster et al. |
| 6,752,960 B1 | 6/2004 | Matsubara et al. |
| 6,776,961 B2 | 8/2004 | Lindsey |
| 6,793,887 B2 | 9/2004 | Itoh |
| 6,849,236 B2 | 2/2005 | Spitz |
| 6,919,044 B1 | 7/2005 | Shibata et al. |
| 6,982,063 B2 | 1/2006 | Hamel et al. |
| 7,015,042 B2 | 3/2006 | Devlin, Sr. |
| 7,033,543 B1 | 4/2006 | Panzer et al. |
| 7,185,288 B2 | 2/2007 | McKeever |
| 7,206,667 B2 | 4/2007 | Kleinschmitt |
| 7,220,385 B2 | 5/2007 | Blecka |
| 7,288,228 B2 | 10/2007 | Lefebvre |
| 7,326,386 B2 | 2/2008 | Sasaki et al. |
| 7,354,510 B2 | 4/2008 | Fujimoto et al. |
| 7,368,084 B2 | 5/2008 | Sklar et al. |
| 7,384,601 B2 | 6/2008 | Matsubara et al. |
| 7,390,458 B2 | 6/2008 | Burow et al. |
| 7,402,282 B2 | 7/2008 | LaCourt et al. |
| 7,462,328 B2 | 12/2008 | Fritz et al. |
| 7,501,094 B2 | 3/2009 | Bysouth |
| 7,572,638 B2 | 8/2009 | Pressman et al. |
| 7,579,190 B2 | 8/2009 | Ostgaard et al. |
| 7,585,678 B2 | 9/2009 | Sigrist |
| 7,666,355 B2 | 2/2010 | Alavie |
| 7,687,033 B2 | 3/2010 | Itoh |
| 7,700,042 B2 | 4/2010 | Matsumoto et al. |
| 7,727,469 B2 | 6/2010 | Takahashi et al. |
| 7,807,446 B2 | 10/2010 | MacIsaac et al. |
| 7,814,788 B2 | 10/2010 | Halaka et al. |
| 7,854,892 B2 | 12/2010 | Veiner et al. |
| 7,858,041 B2 | 12/2010 | Muraishi et al. |
| 7,867,768 B2 | 1/2011 | Ryan et al. |
| 7,879,292 B2 | 2/2011 | Nagai et al. |
| 7,885,077 B2 | 2/2011 | Sass et al. |
| 7,939,020 B2 | 5/2011 | Nogawa et al. |
| 7,972,579 B2 | 7/2011 | Brunner |
| 7,985,375 B2 | 7/2011 | Edens et al. |
| 7,998,409 B2 | 8/2011 | Veiner et al. |
| 8,034,293 B2 | 10/2011 | Kumar et al. |
| 8,100,266 B2 | 1/2012 | Lackner et al. |
| 8,206,663 B2 | 2/2012 | Nagai |
| 8,142,719 B2 | 3/2012 | Matthias et al. |
| 8,148,163 B2 | 4/2012 | Hofstadler |
| 8,158,060 B2 | 4/2012 | Nagai |
| 8,178,043 B2 | 5/2012 | Burkhardt |
| 8,211,701 B2 | 7/2012 | Spence et al. |
| 8,226,889 B2 | 7/2012 | Nakaya |
| 8,252,232 B2 | 8/2012 | Neeper et al. |
| 8,257,650 B2 | 9/2012 | Chow et al. |
| 8,277,729 B2 | 10/2012 | Matsuo et al. |
| 8,278,108 B2 | 10/2012 | Wada et al. |
| 8,282,895 B2 | 10/2012 | Miller et al. |
| 8,329,103 B2 | 12/2012 | Wakamiya et al. |
| 8,337,755 B2 | 12/2012 | Bendele et al. |
| 8,357,538 B2 | 1/2013 | Self et al. |
| 8,383,411 B2 | 2/2013 | Kawamura |
| 8,386,195 B2 | 2/2013 | Feingold et al. |
| 8,431,079 B2 | 4/2013 | Rosenberg et al. |
| 8,431,404 B2 | 4/2013 | Spence |
| 8,455,256 B2 | 6/2013 | Yamoto et al. |
| 8,480,977 B2 | 7/2013 | Gunji |
| 8,496,877 B2 | 7/2013 | Yamazaki et al. |
| 8,529,836 B2 | 9/2013 | Winther et al. |
| 8,535,607 B2 | 9/2013 | Wakamiya et al. |
| 8,545,760 B2 | 10/2013 | Yamamoto et al. |
| 8,551,404 B2 | 10/2013 | Nagai et al. |
| 8,557,599 B2 | 10/2013 | Koyata et al. |
| 8,616,072 B2 | 12/2013 | Boeke et al. |
| 8,632,725 B2 | 1/2014 | Yamazaki et al. |
| 8,652,832 B2 | 2/2014 | Kondo |
| 8,658,417 B2 | 2/2014 | Godsey et al. |
| 8,679,421 B2 | 3/2014 | Sano et al. |
| 8,703,492 B2 | 4/2014 | Self et al. |
| 8,731,712 B2 | 5/2014 | Hagen et al. |
| 8,747,745 B2 | 6/2014 | Kitaoka |
| 8,758,685 B2 | 6/2014 | Komatsu et al. |
| 8,778,268 B2 | 7/2014 | Takehara et al. |
| 8,778,281 B2 | 7/2014 | Holenstein et al. |
| 8,778,696 B2 | 7/2014 | Gutmann et al. |
| 8,784,735 B2 | 7/2014 | Winther et al. |
| 8,784,750 B2 | 7/2014 | Gunji |
| 8,883,078 B2 | 11/2014 | Humada et al. |
| 8,894,930 B2 | 11/2014 | Mizumoto |
| 8,926,902 B2 | 1/2015 | Pedrazzini |

(56) References Cited

U.S. PATENT DOCUMENTS

| | | | |
|---|---|---|---|
| 8,945,470 B2 | 2/2015 | Kuwano et al. | |
| 8,951,805 B2 | 2/2015 | Fritchie et al. | |
| 8,956,569 B2 | 2/2015 | Hamada et al. | |
| 8,965,558 B2 | 2/2015 | Haas et al. | |
| 9,028,756 B2 | 5/2015 | Yamamoto et al. | |
| 9,034,257 B2 | 5/2015 | Covey et al. | |
| 9,057,672 B2 | 6/2015 | Mckeen et al. | |
| 9,063,103 B2 | 6/2015 | Pedrazzini | |
| 9,103,806 B2 | 8/2015 | Massaro | |
| 9,114,399 B2 | 8/2015 | Knight et al. | |
| 9,117,192 B2 | 8/2015 | Clark et al. | |
| 9,134,332 B2 | 9/2015 | Frey et al. | |
| 9,134,334 B2 | 9/2015 | Gunji | |
| 9,140,632 B2 | 9/2015 | Furrer | |
| 9,164,019 B2 | 10/2015 | Geach | |
| 9,164,115 B2 | 10/2015 | Davis et al. | |
| 9,180,447 B2 | 11/2015 | Schlegel et al. | |
| 9,248,422 B2 | 2/2016 | Ching et al. | |
| 9,335,338 B2 | 5/2016 | Ochranek et al. | |
| 9,506,943 B2 | 11/2016 | Müller et al. | |
| 10,101,349 B2 | 10/2018 | Antoni et al. | |
| 2002/0072112 A1* | 6/2002 | Atwood | G05D 23/1917 435/303.1 |
| 2003/0000597 A1 | 1/2003 | Ganz et al. | |
| 2004/0142486 A1 | 7/2004 | Weselak et al. | |
| 2004/0184959 A1 | 9/2004 | Itoh | |
| 2005/0047963 A1 | 3/2005 | Safar et al. | |
| 2005/0158212 A1 | 7/2005 | Yavilevich | |
| 2006/0093530 A1 | 5/2006 | Ueda | |
| 2006/0204997 A1 | 9/2006 | Macioszek et al. | |
| 2006/0210435 A1 | 9/2006 | Alavie et al. | |
| 2007/0098597 A1 | 5/2007 | Brunner | |
| 2007/0134131 A1 | 6/2007 | Watson et al. | |
| 2007/0290004 A1 | 12/2007 | Lee et al. | |
| 2009/0047179 A1 | 2/2009 | Ping et al. | |
| 2010/0126286 A1 | 5/2010 | Self et al. | |
| 2011/0091364 A1 | 4/2011 | Voit | |
| 2011/0263461 A1* | 10/2011 | Kastury | B01L 3/50853 506/40 |
| 2011/0306051 A1 | 12/2011 | Belz et al. | |
| 2011/0306053 A1 | 12/2011 | Ochsenbein et al. | |
| 2012/0318076 A1 | 12/2012 | Kappelhoff et al. | |
| 2013/0065797 A1 | 3/2013 | Silbert et al. | |
| 2013/0116102 A1 | 5/2013 | Hansen | |
| 2013/0164853 A1 | 6/2013 | Belz et al. | |
| 2013/0230860 A1 | 9/2013 | Park et al. | |
| 2014/0050637 A1 | 2/2014 | Giovanoli et al. | |
| 2014/0112843 A1 | 4/2014 | Thomas et al. | |
| 2014/0241946 A1 | 8/2014 | Self et al. | |
| 2015/0273468 A1 | 10/2015 | Croquette et al. | |
| 2015/0343439 A1 | 12/2015 | Burroughs et al. | |
| 2017/0067922 A1 | 3/2017 | Antoni et al. | |
| 2017/0248626 A1 | 8/2017 | Procyshyn et al. | |

FOREIGN PATENT DOCUMENTS

| | | | |
|---|---|---|---|
| CN | 103364255 A | 10/2013 | |
| CN | 103538076 A | 1/2014 | |
| CN | 103869089 A | 6/2014 | |
| CN | 103975244 A | 8/2014 | |
| CN | 203981612 U | 12/2014 | |
| CN | 204198728 U | 3/2015 | |
| CN | 204911556 U | 12/2015 | |
| CN | 205077063 U | 3/2016 | |
| CN | 207067156 U | 3/2018 | |
| EP | 0745855 B1 | 12/1996 | |
| EP | 0895088 B1 | 2/1999 | |
| EP | 2333559 A1 | 6/2011 | |
| EP | 3078972 A1 | 10/2016 | |
| JP | 5781557 U | 5/1982 | |
| JP | S58184878 U | 12/1983 | |
| JP | H02167473 A | 6/1990 | |
| JP | H0618531 A | 1/1994 | |
| JP | H07229904 A | 8/1995 | |
| JP | H08304408 A | 11/1996 | |
| JP | H1096734 | 4/1998 | |
| JP | 2001504229 A | 3/2001 | |
| JP | 2001505648 A | 4/2001 | |
| JP | 2002340912 A | 11/2002 | |
| JP | 2008532048 A | 8/2008 | |
| JP | 2008261735 A | 10/2008 | |
| JP | 2009098114 A | 5/2009 | |
| JP | 2010536332 A | 12/2010 | |
| JP | 2011123066 A | 6/2011 | |
| JP | 2015511313 A | 4/2015 | |
| JP | 2015131260 A | 7/2015 | |
| JP | 2017517000 A | 6/2017 | |
| WO | WO-9108491 A1 * | 6/1991 | |
| WO | 9503548 A1 | 2/1995 | |
| WO | WO 2009/024560 A1 | 2/2009 | |
| WO | WO 2011/101467 A1 | 8/2011 | |
| WO | 2013168559 A1 | 11/2013 | |
| WO | WO-2014143044 A1 * | 9/2014 | B01L 3/50851 |
| WO | 2015108164 A1 | 7/2015 | |

OTHER PUBLICATIONS

Office Action issued in corresponding Chinese Patent Application No. 2017800116300 dated Apr. 26, 2022, (8 pp.).
Office Action issued in corresponding Chinese Patent Application No. 2017800245867 dated May 11, 2022, (14 pp.).
Office Action for corresponding CN Application No. 201780011630.0 dated Aug. 3, 2022, (11 pages).
Office Action issued in corresponding European Patent Application No. 17708112.2 dated Aug. 30, 2022, (10 pp.).
Office Action issued in corresponding CN Patent Application No. 201780024920.9 dated Feb. 21, 2022, (27 pages).
Chinese Office Action received in Chinese Patent Application No. 2017800245867, dated Dec. 3, 2021, pp. 47.
Office Action issued in corresponding Australian Patent Application No. 2017254365, dated Jan. 20, 2022, 4 pp.
Extended European Search Report for corresponding European Patent Application No. 21166097.2 dated Jun. 22, 2021, 9 pp.
First Examination Report issued by Australian Patent Office for corresponding AU Patent Application No. 2017252156, dated Jul. 2, 2021, 4 pp.
Full Examination Report for corresponding Australian Application No. 2017220028 dated May 14, 2021 (3 pages).
Full Examination Report received in corresponding Australian Patent Application No. 2017254365, dated Jul. 8, 2021, 5 pp.
International Search Report and Written Opinion from corresponding International Application No. PCT/US2017/018346 dated May 11, 2017.
International Search Report and Written Opinion from corresponding International application No. PCT/US2017/018298 dated Jul. 12, 2018.
International Search Report and Written Opinion from corresponding International application No. PCT/US2017/018358 dated Nov. 7, 2017.
Japanese Notice of Refusal dated Jan. 27, 2021 in JP application No. 2018-555453.
Notice of Reasons for Refusal issued in corresponding JP Patent Application No. 2018-555526 dated Feb. 2, 2021, 13 pp.
Office Action issued in corresponding Japanese Patent Application No. 2018-543609 dated Feb. 25, 2021, 10 pp.
Held, P. G., et al., "Automated Procedures For The Quantitation of Protein", Biotechniques Rapid Dispatches, Informa Healthcare, US, vol. 17, No. 5, XP000474857, (Nov. 1, 1994), pp. 988-991.
Simport, "PCR—The assurance of highly accurate and contaminant-free proceduresLean-Driven Innovation11", URL:http://www.simport.com/documents/PCR2014Web.pdf/, (Mar. 30, 2016).
Thermofischer, "How to Use MicroAmp (TM) Reaction Plates, Tube Strips, and Tubes For use with: Applied Biosystems (TM) thermal cyclers and real-time PCR systems Publication No. 100033471 Revision A—How to use MicroAmp (TM) plates How to use MicroAmp", XP055487397, Retrieved from the Internet: URL:https://assets.fishersci.com/TFS-Asset s/LSG/manuals/100033471_

(56) References Cited

OTHER PUBLICATIONS

MicroAmpReactionPlates_TubeStrips_Tubes_UB.pdf [retrieved on Jun. 25, 2018] Aug. 25, 2015, (Aug. 25, 2015), pp. 1-8.
Office Action issued in corresponding Canadian Patent Application No. 3,019,765 dated Mar. 6, 2023 (5 pp.).
Office Action issued in corresponding Canadian Patent Application No. 3,019,789 dated Mar. 3, 2023 (3 pp.).
First Examination Report issued by Australian Patent Office for corresponding AU Patent Application No. 2022202311, dated May 26, 2023, 4 pp.
Office Action from corresponding Japanese Patent Application No. 2022-108752 dated Jul. 4, 2023 (6 pp.).

\* cited by examiner

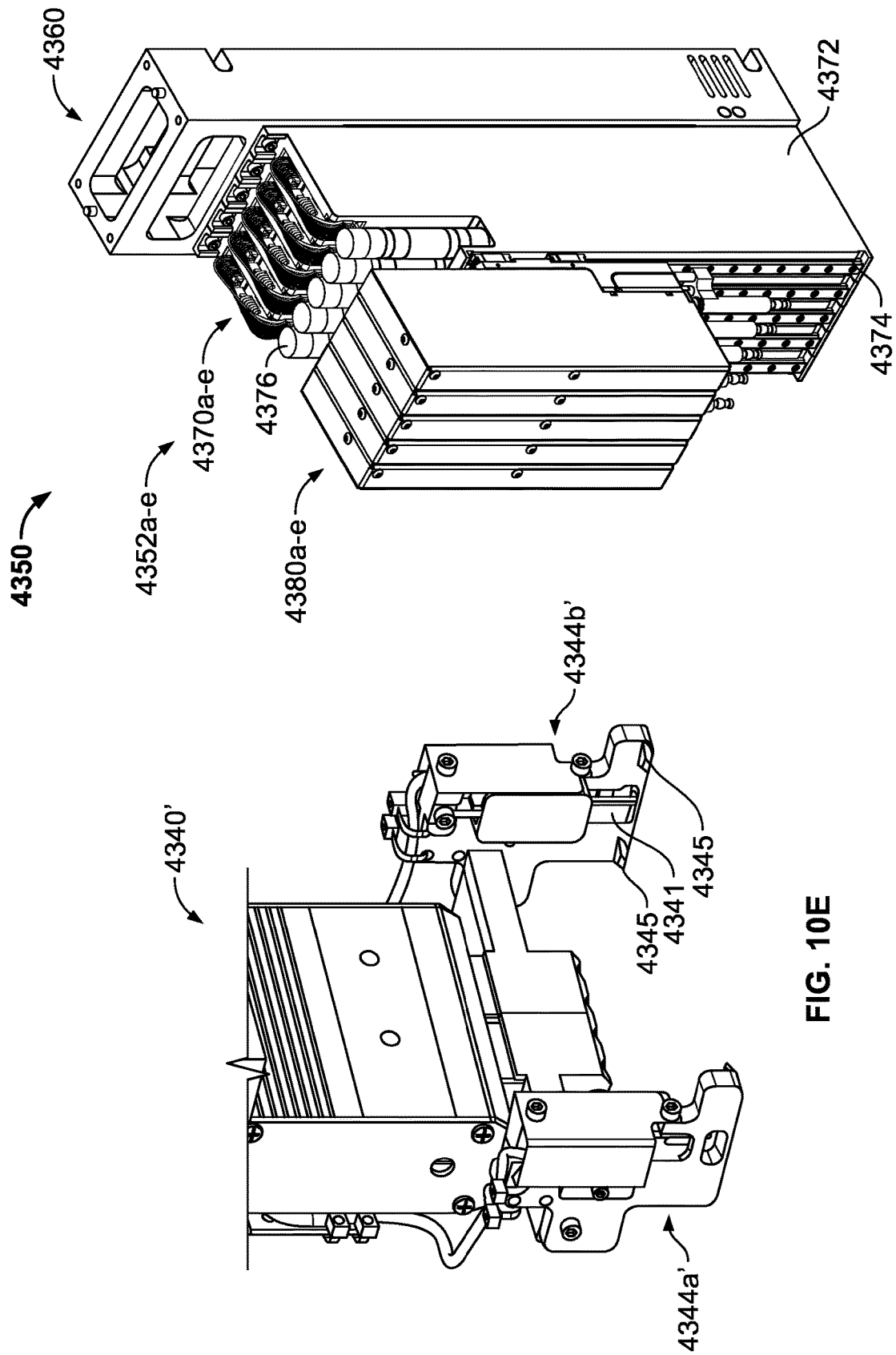

AUTOMATED DIAGNOSTIC ANALYZER AND METHOD FOR ITS OPERATION

CROSS-REFERENCE TO RELATED APPLICATION

This application is a divisional application of U.S. application Ser. No. 16/088,939, filed on Sep. 27, 2018, allowed, which application is a national phase entry under 35 U.S.C. § 371 of International Application No. PCT/US2017/018298, filed Feb. 17, 2017, published in English, which application claims the benefit of the filing date of U.S. Provisional Application No. 62/326,395, filed Apr. 22, 2016, the disclosures of which are hereby incorporated herein by reference.

BACKGROUND OF THE INVENTION

Diagnostic testing of biological samples is instrumental in the health care industry's efforts to quickly and effectively diagnose and treat disease. Clinical laboratories that perform such diagnostic testing already receive hundreds or thousands of samples on a daily basis with an ever increasing demand. The challenge of managing such large quantities of samples has been assisted by the automation of sample analysis. Automated sample analysis is typically performed by automated analyzers that are commonly self-contained systems which perform multistep processes on the biological samples to obtain diagnostic results.

Several current automated clinical analyzers offer a user an array of automated tests or assays that can be performed on a provided sample. Additionally, when samples arrive at the laboratory, they are often not ready for analysis. In order to prepare a sample for testing with an automated analyzer, a lab technician typically transfers an aliquot of the sample from a primary container, as received by the laboratory, to a secondary container which is amenable to the analyzer. In addition, the technician typically must know what tests are to be performed on the sample so that the technician can select a test specific reagent or diluent to be paired with the sample. This can be time consuming and can lead to operator error and exposure to communicable diseases.

Pre-analytical systems meant to help prepare a sample for analysis and further remove the operator from the workflow between the laboratory's receipt of a sample and the analyzer's test results also exist. However, many of these systems still require significant technician involvement, such as: prior to loading samples in the pre-analytical system; after the samples have been prepared by the pre-analytical system; and after the analyzers have completed analysis.

For example, some pre-analytical systems may automatically transfer an aliquot of sample from a first container to a second container. However, such systems often require a technician to manually match identification codes of the first and second containers prior to loading them into the system, which can be time consuming and is prone to error.

In addition, many of these systems are not capable of being integrated with one or more analyzers, and, conversely, the analyzers are not capable of being integrated with such systems. In this regard, a technician must be present to manually transfer the samples from the pre-analytical system to an analyzer and from the analyzer to a storage location once analysis is complete. This requires skilled labor to perform menial tasks and can create distractions in that the technician must be ever mindful of the progress of the samples within the pre-analytical system and analyzer so that the technician is prepared to transfer samples when ready in order to minimize downtime.

Moreover, current pre-analytical systems generally prepare samples at different rates than the analyzers evaluate such samples. This further complicates the integration between pre-analytical systems and analyzers. In this regard, a technician may be required to continuously keep track of samples prepared by the pre-analytical system until a full batch of samples is accumulated for manual transfer to an analyzer. Alternatively, technicians may transfer partial batches to an analyzer, which can reduce the analyzer's productivity.

Thus, while current automated pre-analytical systems and analyzers are beneficial to the clinical laboratory, there is room for better integration and automation of various systems.

BRIEF SUMMARY OF THE INVENTION

The present disclosure describes devices, systems, and methods for sample processing and analysis. In particular, an analyzer that is included in a high-throughput system is described. In one embodiment, the high-throughput system includes a pre-analytical system integrated with the analyzer. In another embodiment, the high-throughput system includes at least an additional analyzer and a pre-analytical system integrated with both analyzers. These components (i.e., analyzers and pre-analytical system) are modular and are capable of being integrated in several different configurations to conform to a particular laboratory's diagnostic needs.

The particular analyzer described herein generally has multiple decks or levels in a vertical arrangement. One deck may house electronic components and consumable waste which includes liquid waste and solid waste. Another deck is a processing deck in which sample processing and analysis take place. This deck also stores or inventories large quantities of consumables, which include pipette tips, reagent troughs, amplification plates, extraction container holders, a roll of plate seal material and the like. In one embodiment, enough consumables can be stored on the analyzer to allow the analyzer to operate for an entire 8 hour work shift at maximum throughput without reloading the system. This deck may also include a plate sealer, orbital shakers, reagent trough puncture tools, and readers/detectors for detecting an analyte, such as a DNA target.

A further deck includes a multipurpose robot which includes a Cartesian movement system that allows a payload suspended from such system to traverse the interior of the analyzer above the processing deck. The payload includes a vision system, a consumable gripper, and a multichannel pipettor. The vision system provides barcoding/identification abilities and to perform other machine vision tasks particularly as they relate to functions involving the gripper. The consumable gripper moves consumables about analyzer such as the reagent trough puncture tool and amplification plates. The multichannel pipettor performs all of the liquid handling requirements of the analyzer.

BRIEF DESCRIPTION OF THE DRAWINGS

The features, aspects, and advantages of the present invention will become better understood with regard to the following description, appended claims, and accompanying drawings in which:

FIG. 10E is a perspective view of a gripper according to another embodiment of the present disclosure.

FIG. 10F is a front perspective view of a multichannel pipettor of the payload of FIG. 10B.

DETAILED DESCRIPTION

Definitions

As used herein, the terms "about," "generally," and "substantially" are intended to mean that slight deviations from absolute are included within the scope of the term so modified. Also when referring to specific directions, such as left, right, front, back, up and down, in the following discussion, it should be understood that such directions are described with regard to the perspective of a user facing the below described system during exemplary operation.

HT System Generally

Figure 1:
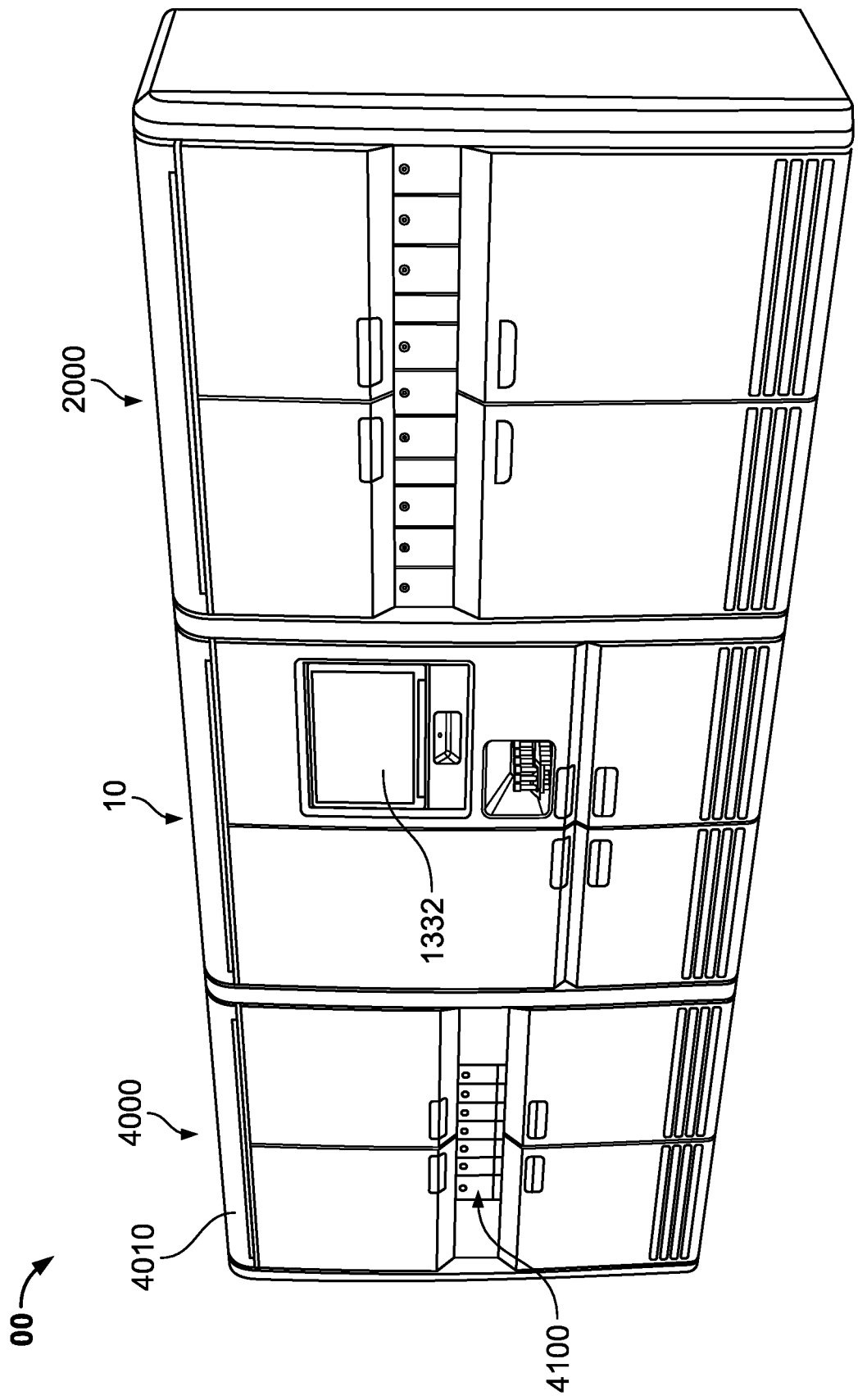
FIG. 1 is a front perspective view of a high-throughput diagnostic system according to one embodiment of the present disclosure.

FIG. 1 depicts a high-throughput system 00 which includes a first analyzer 2000, a second analyzer 4000 and a pre-analytical system 10, such as the pre-analytical system described in U.S. Provisional Application 62/296,349 ("the '349 Application"), the disclosure of which is hereby incorporated by reference herein in its entirety. The analyzers 2000, 4000 and pre-analytical system 10 are modular such that they can be physically connected and disconnected from one another and also electronically connected and disconnected from one another. Although second analyzer 4000 is different from first analyzer 2000 in terms of the operations and assays they perform, it should be understood that first analyzer 2000 can be a duplicate of second analyzer 4000 so that pre-analytical system 10 couples to at least two of the same analyzers. It should also be understood that the modularity of pre-analytical system 10 allows it to couple to any analyzer so configured. As shown, first and second analyzers 2000, 4000 are disposed at opposite sides of pre-analytical system 10 in a linear arrangement. Although, pre-analytical system 10 and analyzers 2000, 4000 are configured for this physical arrangement it is contemplated that pre-analytical system 10 can be configured to accommodate more than two analyzers and that pre-analytical system 10 and analyzers 2000, 4000 can be configured so that they can be placed in other physical arrangements such as in an L-shape, for example.

Analyzer in Relation to System 10 & Viper LT

Figure 7:
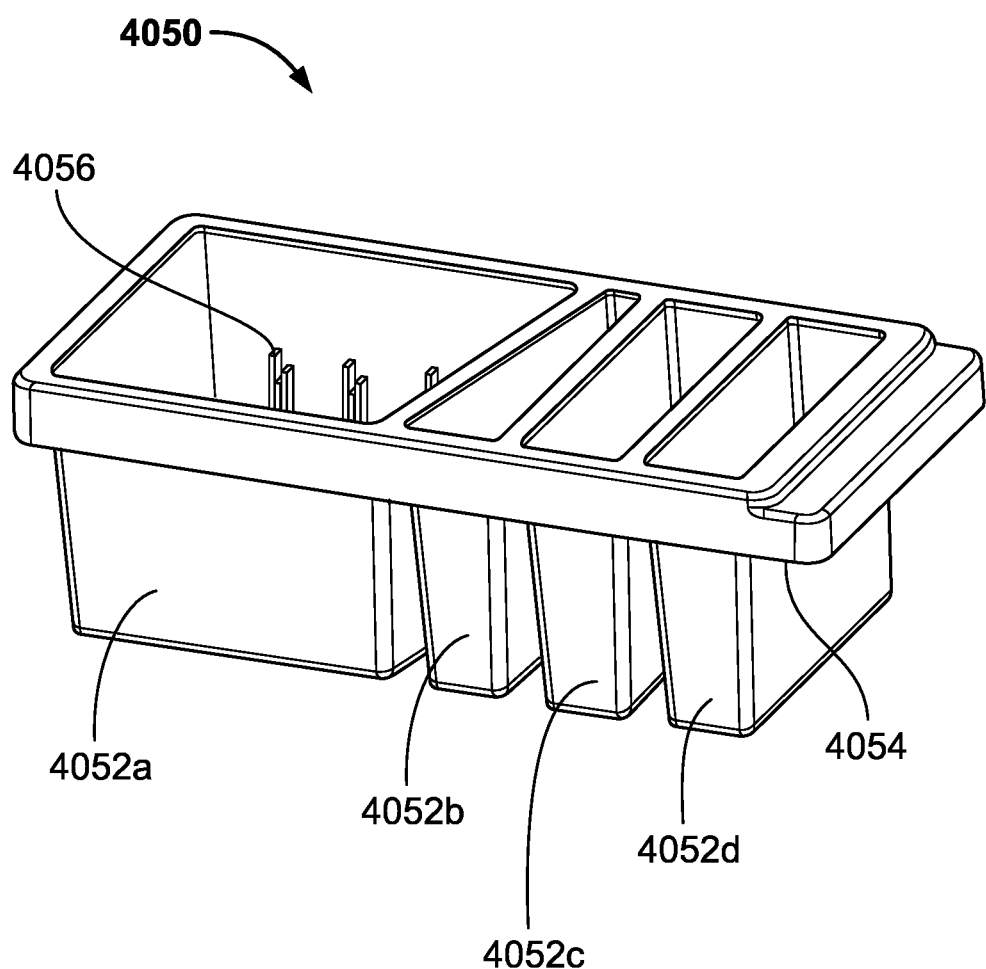
FIG. 7 is a perspective view of a liquid reagent trough assembly according to an embodiment of the disclosure.

Second analyzer 4000 can be coupled to either side of pre-analytical system 10. In this regard, a sample container shuttle transport assembly 300b of pre-analytical system 10, as shown of FIG. 7 of the '349 Application, can extend toward analyzer 4000 when analyzer 4000 is located to the left of system 10 (exemplified in FIG. 1), or a sample container shuttle transport assembly 300a of pre-analytical system 10 can extend toward analyzer 4000 where analyzer 4000 is located to the right of system 10. Such assemblies 300a-b may terminate adjacent to the analyzer's threshold. However, as is described below, analyzer 4000 is has a conveyor that can continue the path of a respective shuttle transport assembly 300 into analyzer 4000. As used herein, "shuttle" can be an rack or carrier structure with a plurality of receptacles, each receptacle sized and configured to receive a sample container.

Analyzer 4000 is similar to and shares many characteristics with the BD Viper™ LT System (Becton Dickinson, Franklin Lakes, N.J.) some of which are identified below. The BD Viper™ LT System is not described in detail herein. However, as explained above, analyzer 4000 is a modular system that is configured to operate in cooperation with an automated system for pre-analytical processing of sample to be assayed using the BD Viper™ LT System system. Such a pre-analytical system is illustrated as system 10. In this regard, analyzer 4000 is an adaptation of the BD Viper™ LT System for modular connectivity and high-throughput processing and analysis and, therefore, includes many additional features that are also described below.

Structural Frame

Figure 2:
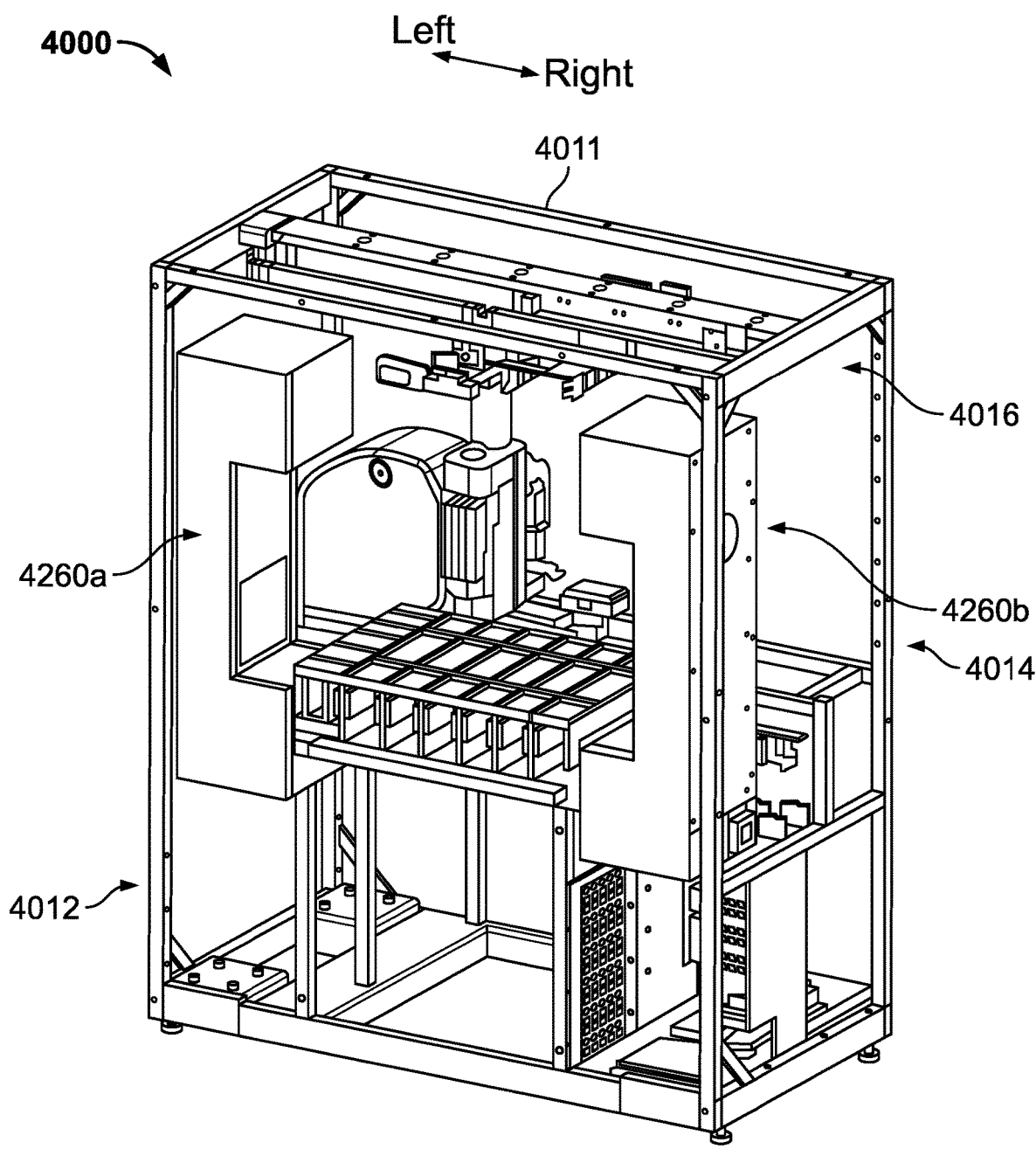
FIG. 2 is a front perspective view of the second analyzer of the system of FIG. 1 according to one embodiment of the present disclosure and absent its external housing.
Figure 3:
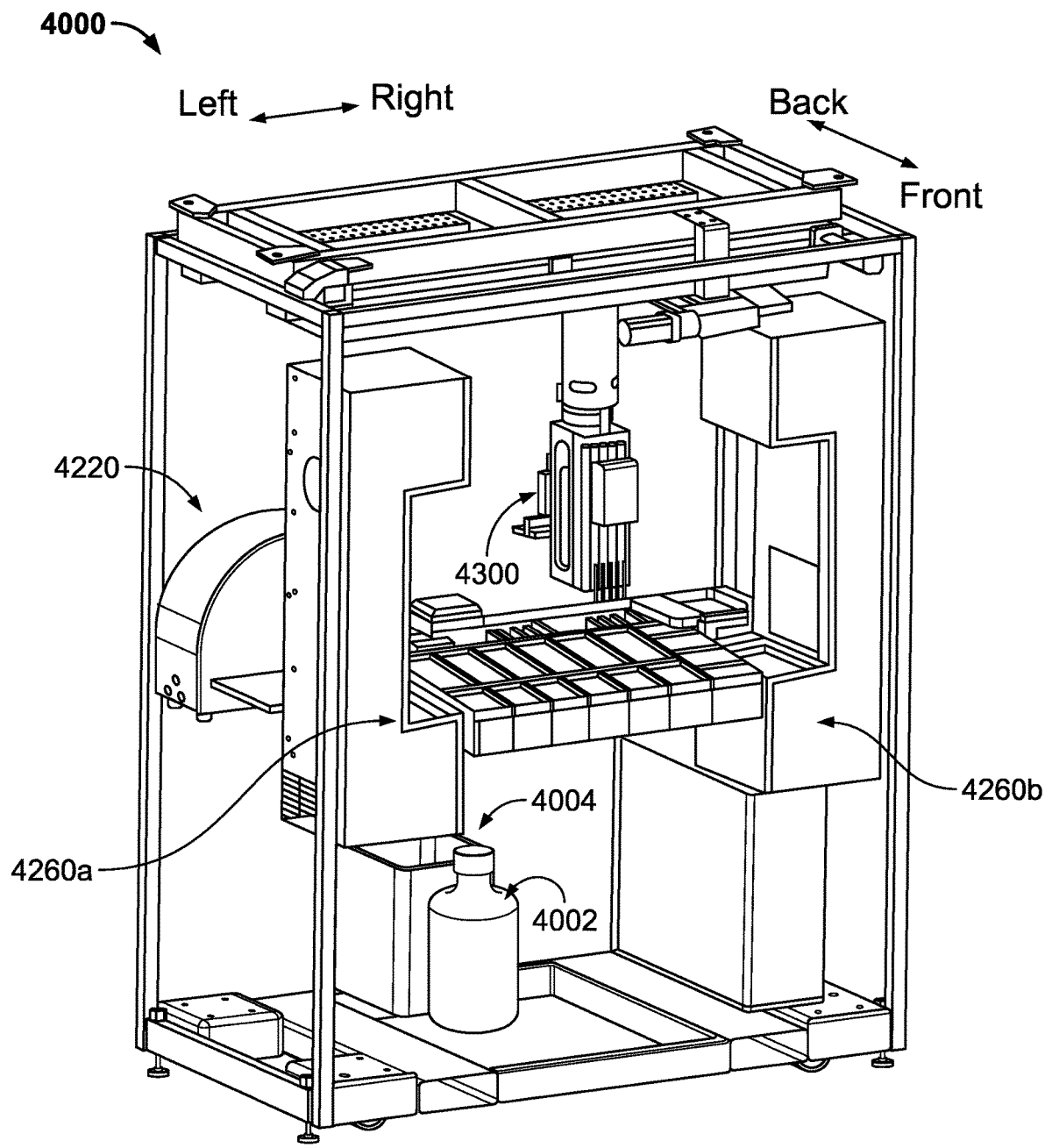
FIG. 3 is another front perspective view of the second analyzer of FIG. 2.
Figure 4:
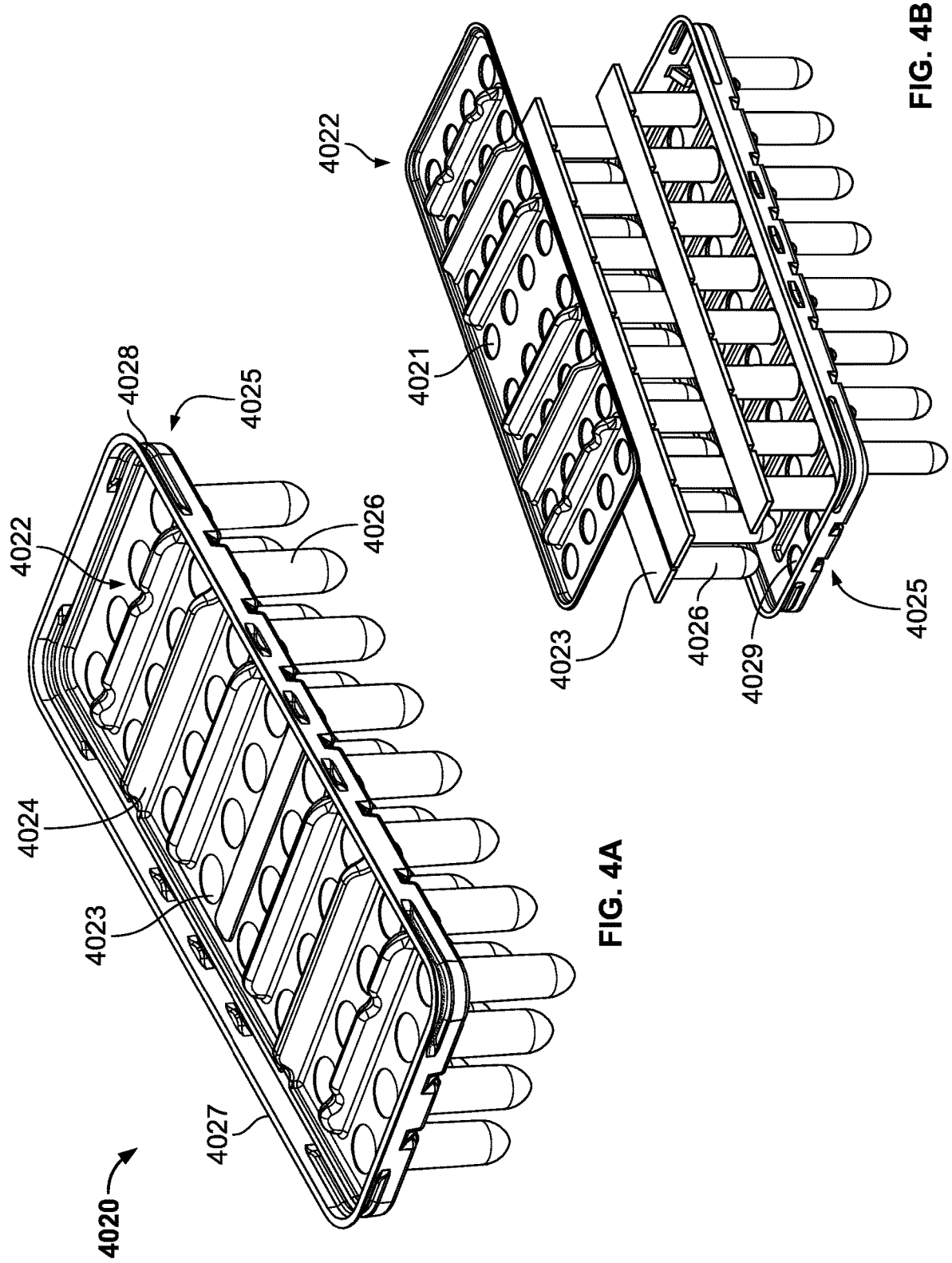
FIG. 4A is a perspective view of an extraction container holder according to an embodiment of the disclosure.
FIG. 4B is an exploded view of the extraction container holder of FIG. 4A.
Figure 5:
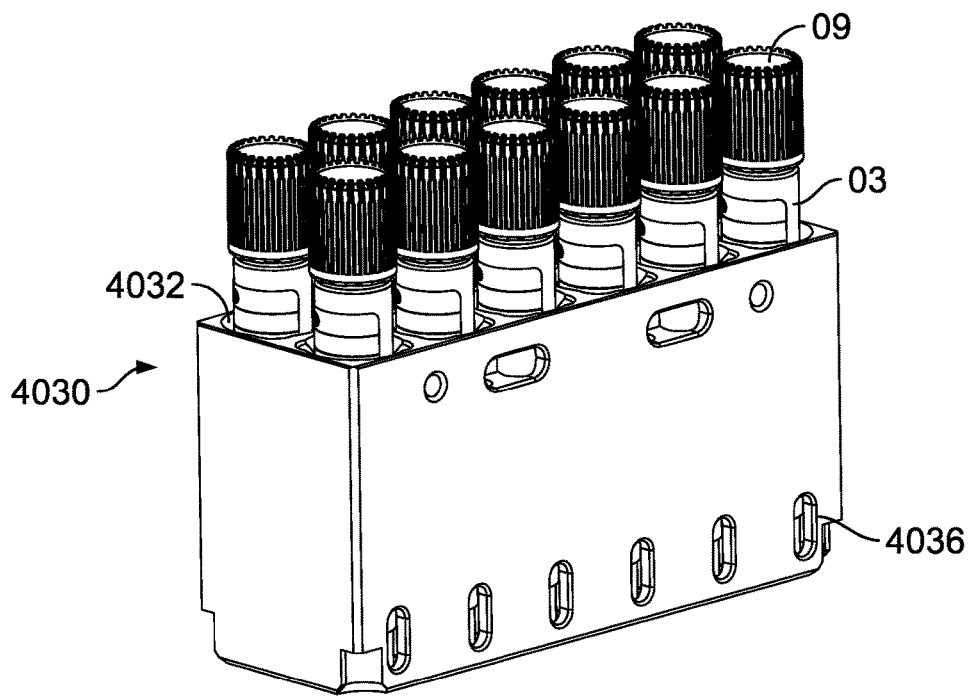
FIG. 5 is a perspective view of a sample container shuttle according to an embodiment of the disclosure.
Figure 6:
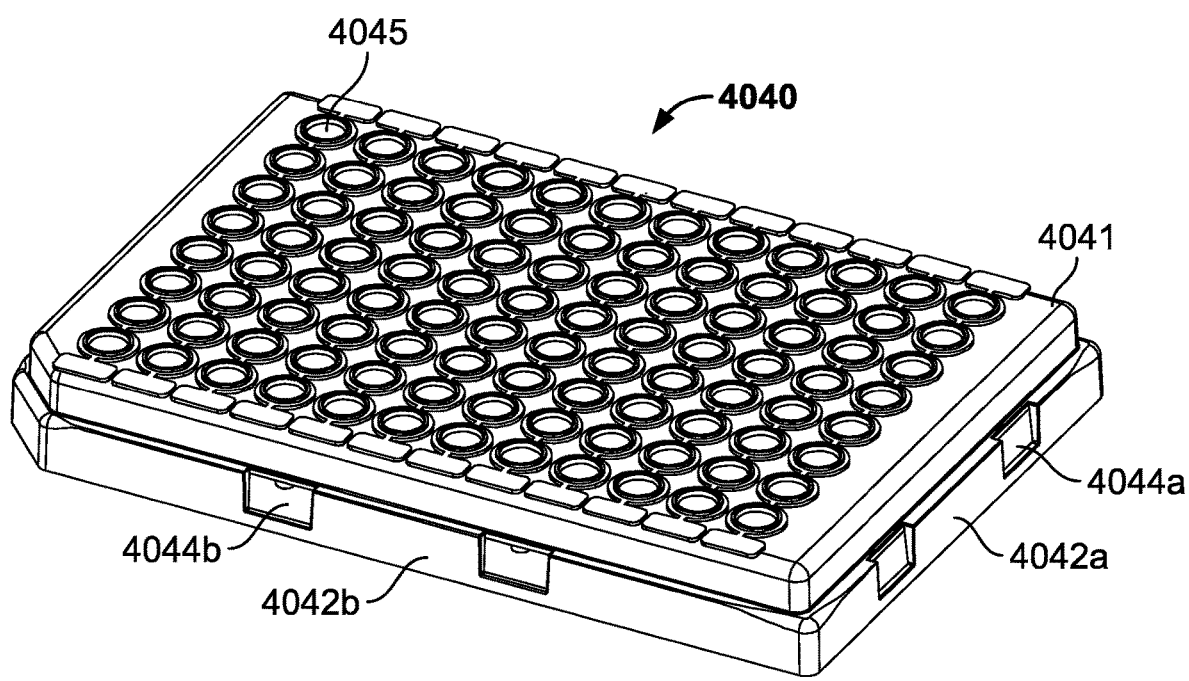
FIG. 6 is a perspective view of an amplification plate according to an embodiment of the disclosure.

As shown in FIGS. 2 and 3, analyzer 4000 includes a structural frame comprised of several support components 4011, such as segments of metal tubing, which are configured to support and define various decks or levels for sample processing and analysis. Such decks may include a supplementary deck 4012, a processing deck 4014, and a multi-purpose robot deck 4016. Analyzer 4000 also includes a housing or shell 4010 that surrounds its internal components, as shown in FIG. 1.

Consumables

Intro

FIGS. 4-7 depict various consumables that can be automatically utilized for performing assays on samples, such as liquid based cytological samples and the like. In particular, analyzer and its consumables are configured to perform HPV assays that detect for multiple stereotypes of HPV (e.g., HPV 16, HPV 18, HPV 33, HPV 45, HPV 58, etc.). Such HPV assays may include, for example, the BD Onclarity™ HPV Assay (Becton Dickinson, Franklin Lakes, N.J.). The ability to perform such assays is partially supported by the consumable design. Such consumables include pipette tips 4062, sample containers 03, sample container shuttles 4030, extraction container holders 4020, amplification plates 4040, and liquid reagent trough assembly 4050.

Extraction Container Holder

Extraction container holder 4020 (FIGS. 4A and 4B) is preferably a plastic thermoformed clamshell that includes a lower portion 4025, upper portion 4022, and a plurality of extraction containers 4026. Each extraction container 4026 may contain Ferric Oxide ("FOX") particles disposed on a strip to extract DNA from samples and is sealed with a lightweight foil 4023 that is penetrable with a pipette tip prior to the addition of a sample.

The lower portion 4025 of the clamshell is a shallow, rectangular vessel with through-holes extending therethrough to allow extraction containers to partially extend through such holes. Thermoformed features 4028 on sidewalls 4027 of the lower clamshell 4025 provide an interference fit with features on a consumable drawer of analyzer 4000. Each of extraction containers 4026 is loaded into lower portion 4025 so that their foil side faces the same direction as sidewalls 4027.

Upper portion 4022 of the clamshell is in the form of a ribbed insert that drops into a space formed by sidewalls 4027 of lower portion 4025 and locks via a set of protrusions (not shown) in the lower portion 4025. A plurality of ribs 4024 extend in a direction transverse to extraction containers 4026 to provide structural stiffness to extraction container holder 4020 which provides a holding force that helps retain upper clamshell 4022 during aspiration via a pipette. A plurality of through-holes 4021 extend through upper portion 4022 between adjacent ribs 4024 so as to allow foil seals 4023 of tubes 4026 to be accessed by a pipette tip. A barcode is located on upper portion 4022 which helps track information such as lot, expiration date, and serial number of the contents of tubes 4026. Extraction container holder 4025 is assembled with enough extraction containers 4026 to perform a single run which, in the embodiment depicted, is 32 extraction containers in a 4×8 arrangement.

Sample Container Shuttle

Sample container shuttle 4030 (FIG. 5) is similar to shuttle 284 of the '349 Application and includes receptacles 4032 each configured to receive a sample container 03. The particular shuttle 4030 depicted includes two rows of six receptacles 4032 for a total of twelve receptacles. However, any number of receptacles 4032 can be provided. For example, shuttle 4030 may include two rows of twelve receptacles 4032 for a total number of 24 receptacles. In the particular analyzer 4000 depicted, a batch of samples may include 12-32. Thus, 1 to 3 shuttles may provide a full batch to analyzer 4000.

Shuttle 4030 also includes transverse openings 4036 which intersect with corresponding receptacles 4032 to allow a sample container retention assembly (described below) to access containers 03 disposed therein. Sample containers 03 are the same as the third-type container 03 of the '349 Application. In this regard, sample containers 03 include caps with a penetrable seal 09.

Amplification Plate

Figure 10A:
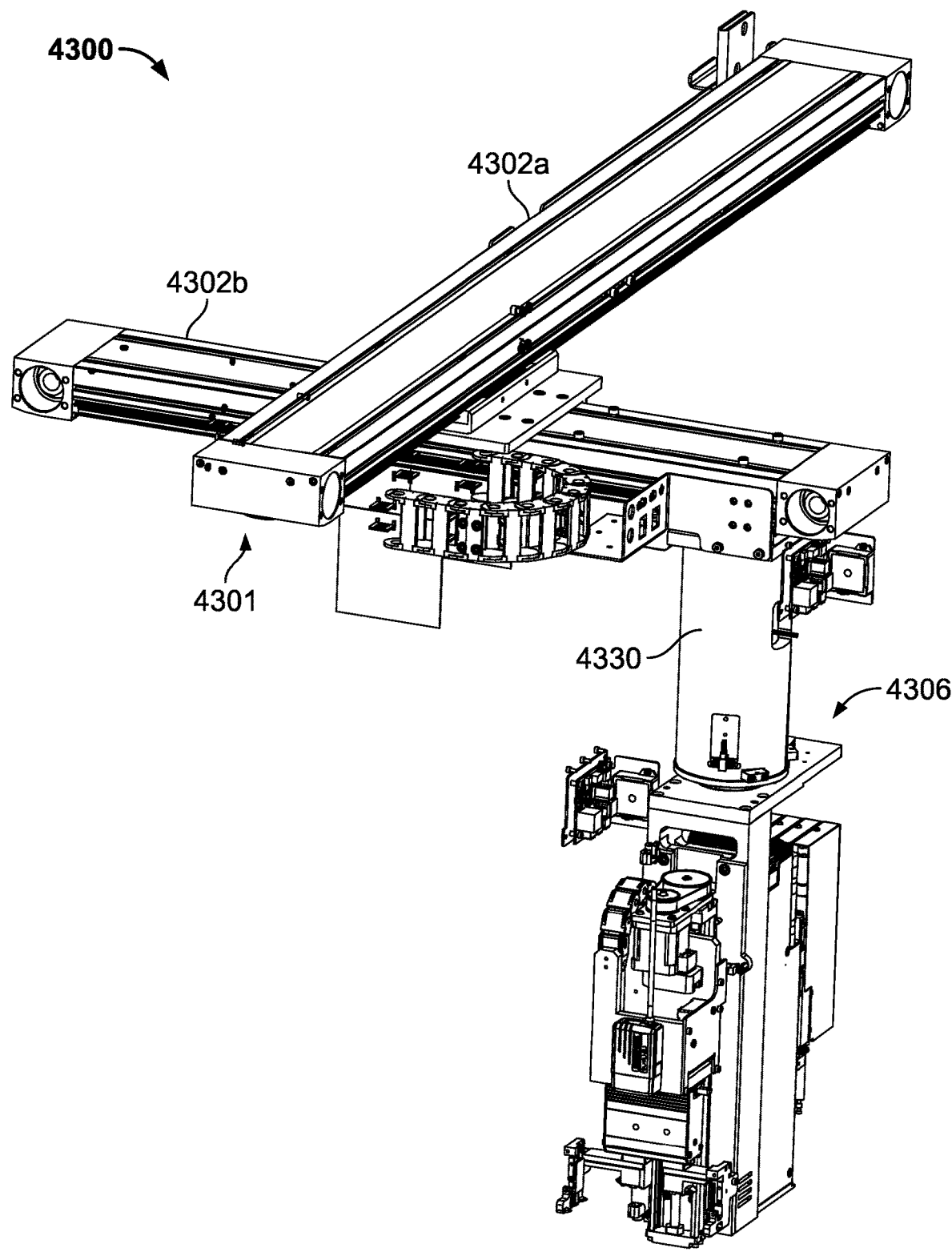
FIG. 10A is a perspective view of a robot assembly according to an embodiment of the disclosure.
Figure 10B:
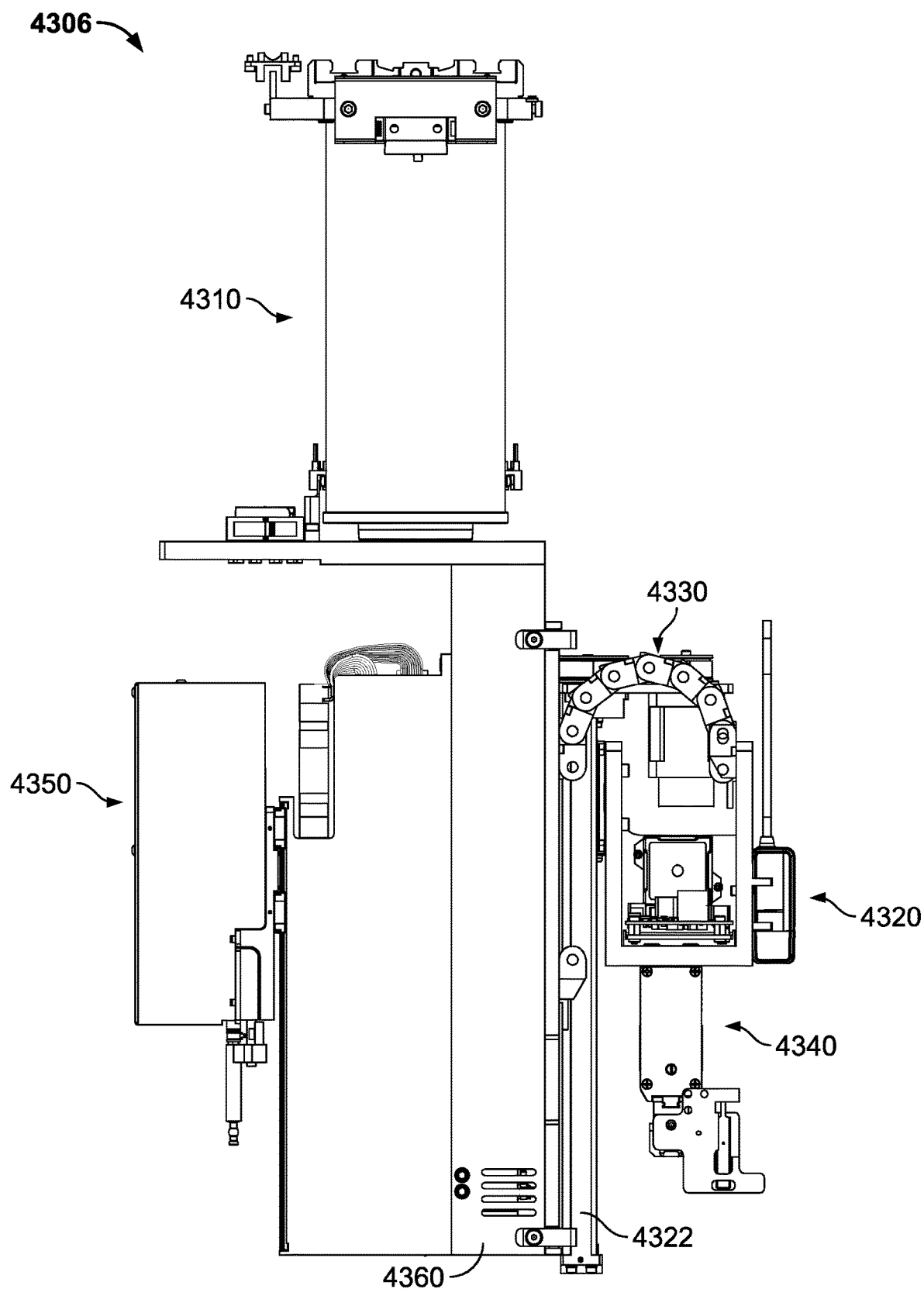
FIG. 10B is a side view of a payload of the robot assembly according to an embodiment of the disclosure.
Figure 10C:
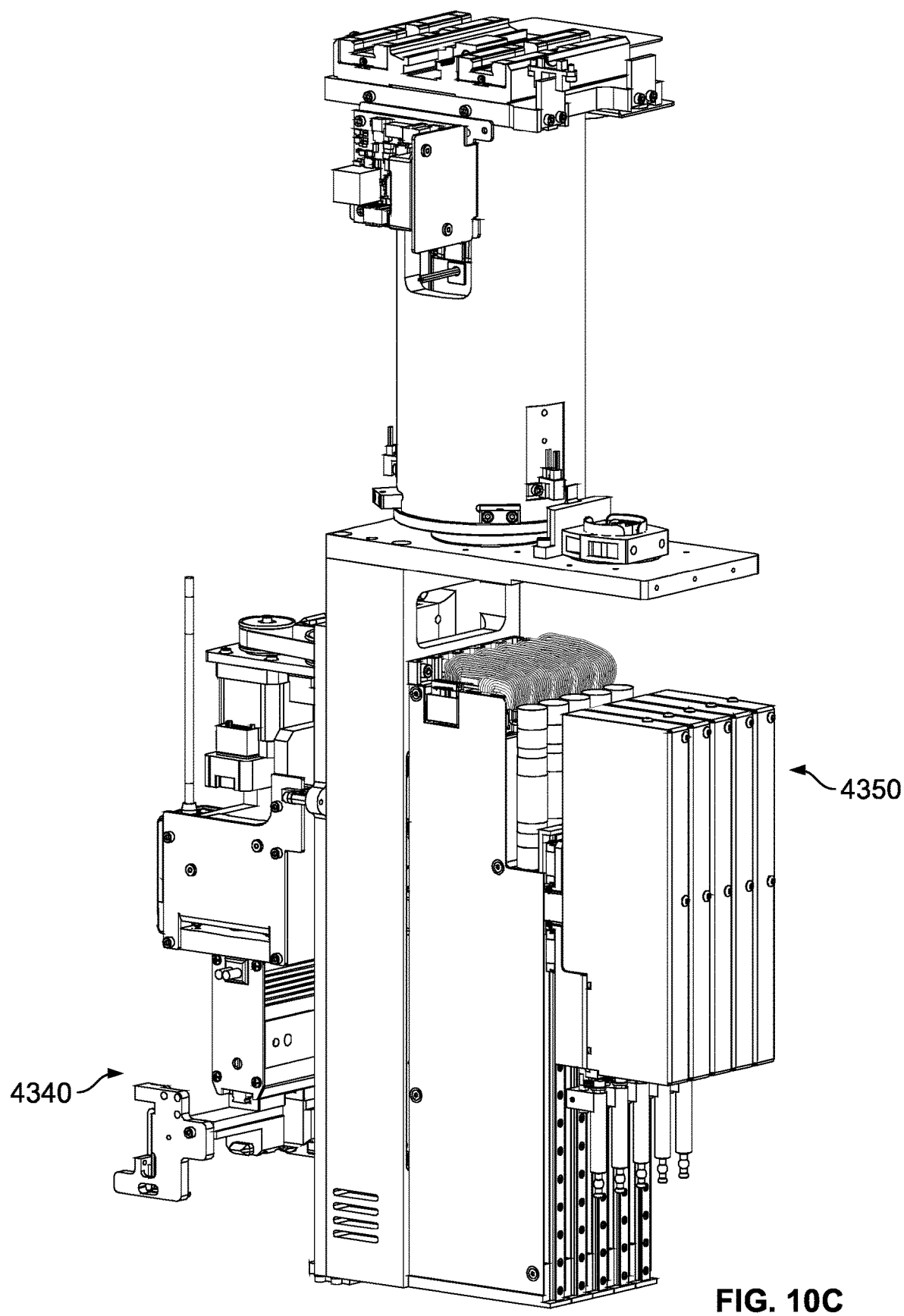
FIG. 10C is a partial front perspective view of the payload of FIG. 10B.
Figure 10D:
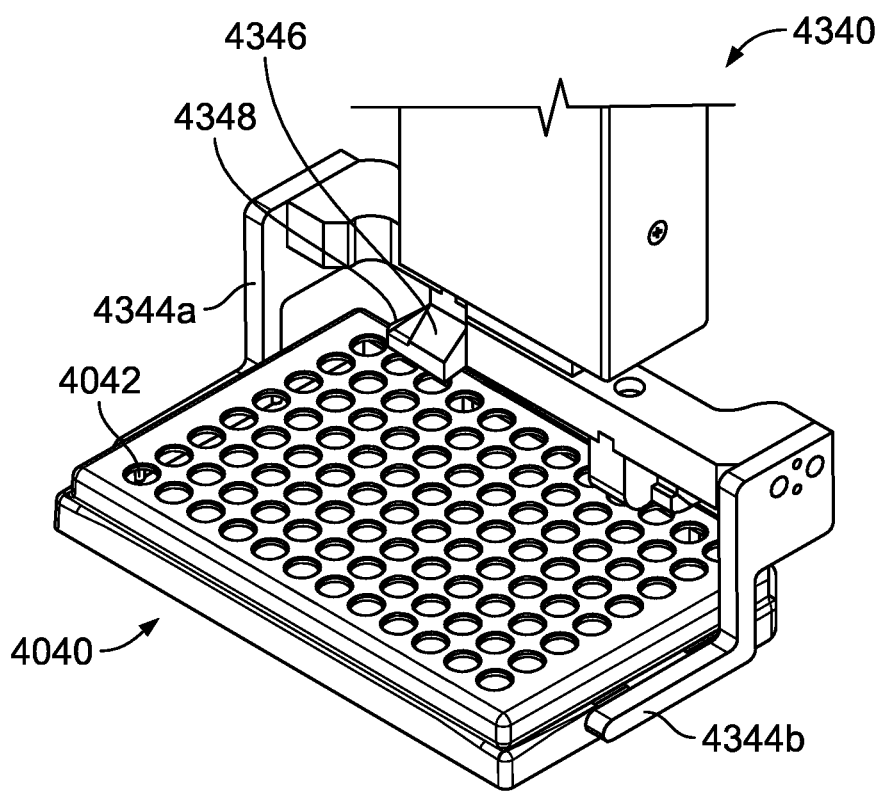
FIG. 10D is a rear perspective view of a gripper of the payload of FIG. 10B gripping an amplification plate.

Amplification plate assembly 4040 (FIG. 6) includes a plate body 4051. Engagement openings 4044 extend into respective sides 4042 of body 4041 which allows a gripper of a multipurpose robot 4300 (FIG. 10A) to engage amplification plate assembly 4040 from opposing sides thereof. For example, openings 4044a extend through side 4042a and a side (not shown) directly opposite that of side 4042a. In addition, openings 4044b extend through side 4042b and through a side (not shown) directly opposite that of side 4044b. This allows robot 4300 to grip and lift plate 4040 while plate is in different orientations. A plurality of tubes that define amplification compartments 4045 are connected to plate body 4041 within openings thereof. Such tubes may be provided in the form of 1×8 strips of polypropylene tubes inserted into plate body 4051. Compartments 4054 are provided with dried down reagents that are utilized for amplification of a DNA target. In this regard, amplification plate 4040 may have color coding for visual identification of the reagents contained in compartments 4045 of the plate 4040. However, in some embodiments, color coding may be absent.

Liquid Reagent Plate

Liquid reagent trough assembly 4050 includes about four separate and linearly arranged troughs 4052 that house bulk reagents. For example, four troughs 4052a-d may be provided so that a first trough 4052a contains a wash buffer, a second through 4052b contains an acid buffer, a third trough 4052c contains a neutralization buffer, and a fourth trough 4052d contains an elution buffer. The volume of such troughs 4052 is such that they can each contain sufficient reagent to perform at least 20 assay runs. This allows sufficient volumes of reagent to be loaded onto analyzer 4000 to last an entire 24 hour period without having to be restocked. First trough 4052a includes tracks 4056 integrated into its sidewall that allow baffling walls (not shown) to be inserted between such tracks 4056 and into trough 4052a to help reduce splashing during the filling process. Second trough 4052b generally has the smallest volume and defines a trapezoidal shaped cavity. This shape provides the requisite volume while also providing a relatively large opening area at one side of the cavity to enable piercing with a sufficiently large tool, such as tool 4240, through which a pipette tip accesses trough 4052b

Figure 11B:
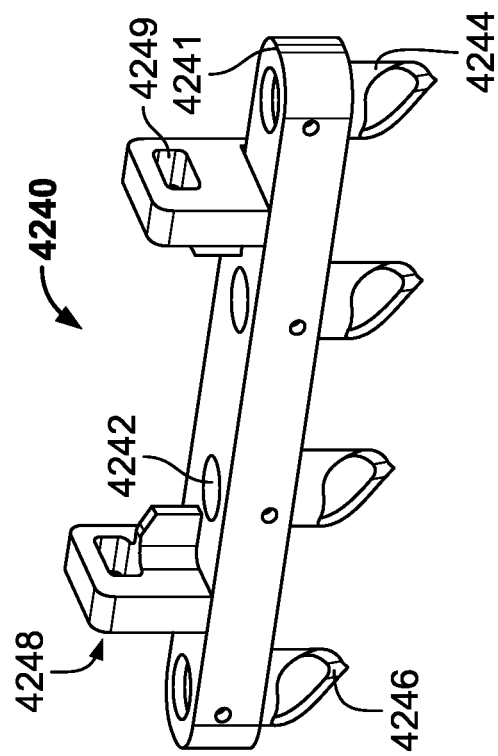
FIG. 11B is a front perspective view of the puncture tool of FIG. 11A.

Assembly includes a heavy duty, penetrable lidding material 4058 (see FIG. 11C) that can be penetrated by puncture tool 4240 (see FIG. 11B) to allow a pipette tip 4062 to access the reagents, as is described below. Liquid reagent trough assembly 4050 also includes a collar 4054 extending around a perimeter thereof that rests on a deck surface and that may be engaged by toggles on the deck surface to hold down assembly 4050.

Pipette Tips

Figure 8A:
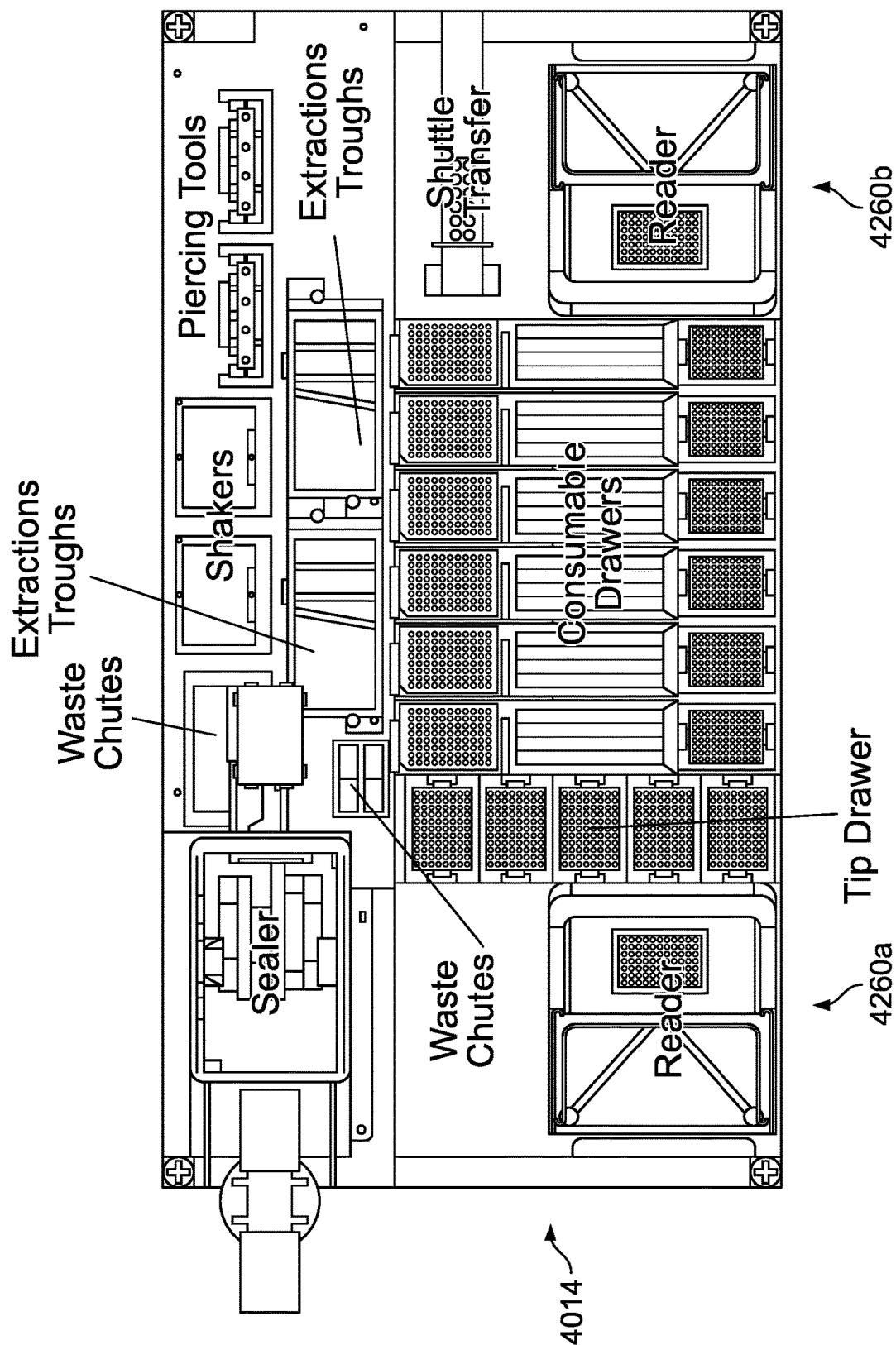
FIG. 8A is a top view of a processing deck according to an embodiment of the present disclosure.
Figure 8B:
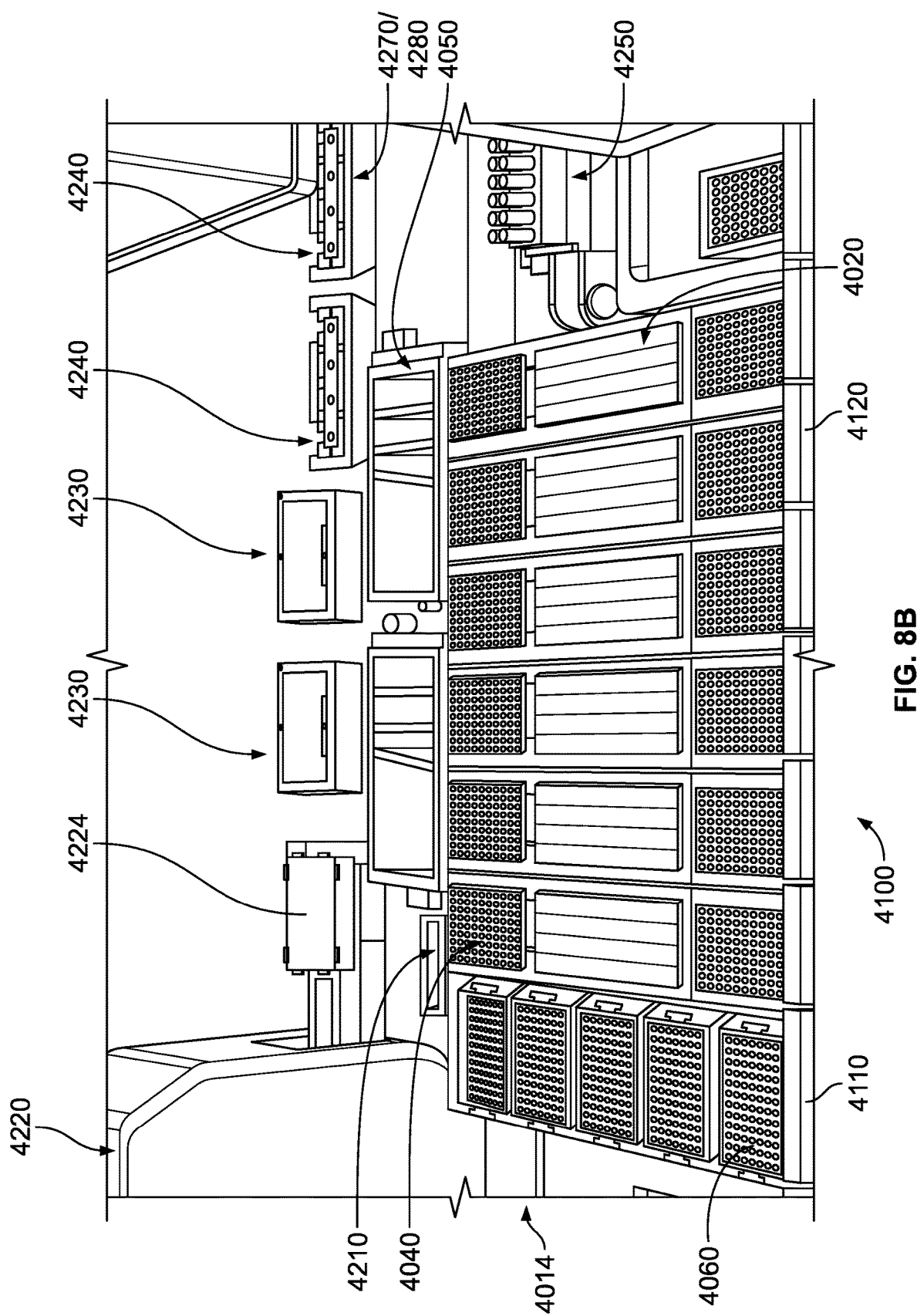
FIG. 8B is a top perspective view of the processing deck of FIG. 8A.

Pipette tips 4062 are provided in tip holders 4060 (See FIG. 8B). In one embodiment of analyzer four 1000-μL tips are used to process each sample. In addition, a single reagent pipette tip is used with each batch of samples. This helps reduce the number of tips utilized as the reagent pipette tip does not come into direct contact with samples.

Referring back to FIGS. 2 and 3, supplementary deck 4012 is disposed adjacent the bottom of analyzer 4000 and is located beneath processing deck 4014. Supplementary deck 4012 houses electronic components and waste repositories. For example, supplementary deck 4012 can include a liquid waste repository 4002 that receives and houses all liquid waste, such as from extraction tubes 4026 during a DNA extraction process and from liquid reagent trough assembly 4050 during an emptying process. This repository 4002 includes a sensing apparatus to monitor empty capacity. Supplementary deck 4012 also includes one or more solid waste repositories 4004 that sit below each of solid waste chutes 4210 (see FIGS. 8A and 8B) that extend through processing deck 4014. For example, a single waste repository may be located under waste chutes 4210 and may collect all solid waste. In another example, two solid waste repositories may be used to collect used pipette tips 4062 and amplification plates 4040, respectively. Each of such aforementioned solid waste repositories may contain a sensing apparatus similar to liquid waste repository 4002 for detecting solid waste level. Such sensing apparatus can include an optical or ultrasonic sensor, for example.

Processing Deck

Layout

FIGS. 8A and 8B depict the processing deck 4014. Processing deck includes consumable drawers 4100, a plate sealer 4220, orbital shakers 4230, piercing tools 4240, reagent trough assemblies 4050, a shuttle transfer station 4250, waste chutes 4210 and readers/detectors.

Drawers

Figure 12:
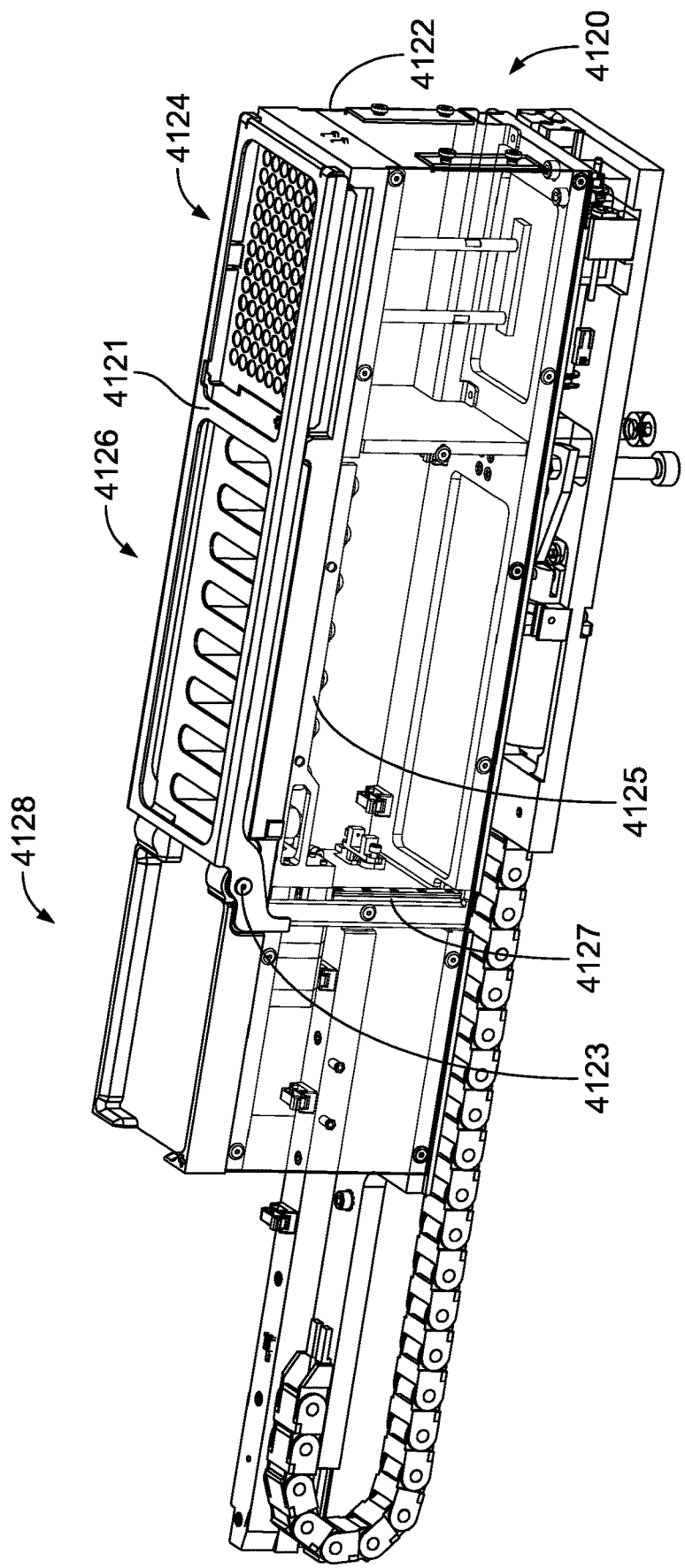
FIG. 12 is a rear, side perspective view of a consumable drawer according to an embodiment of the disclosure.

In the embodiment depicted, processing deck 4014 includes six consumable drawer assemblies 4120, each of which houses the majority of the consumables utilized in an assay workflow, as shown in FIGS. 8A, 8B and 12. In this regard, each of the six drawers 4100 includes from front to back, a pipette tip station 4124, extraction container station 4126, and amplification plate station 4128. Stations 4124, 4126 and 4128 are configured to hold pipette tip holders 4060, extraction container holders 4020, and amplification plates 4040, respectively. In addition, each consumable drawer 4120 houses an extractor module 4125 within its housing 4122, which is similar to the extractor module of the BD Viper™ LT System, and includes moveable magnets which provides the movable magnetic field that is utilized to extract DNA from the samples. Such magnets are housed in each consumable drawer 4120 beneath extractor container station 4126 and are selectively moveable in an up-down direction along rails 4127 which are disposed on sidewalls separating compartments beneath each of stations 4124, 4126 and 4128. As depicted in FIG. 12, extractor 4125 is in an up/extraction position. Consumable drawer assemblies 4120 sit at the front of analyzer 4000 between two detector/readers 4260a-b and each include a visual indicator, such as a colored LED, on a front end thereof that indicates its status to a user to let a user know that the drawer is currently being used, is ready to be used, or needs replenishing with consumables.

Drawer assemblies 4120 also include a hinged retention feature 4121. In the depicted embodiment, retention feature 4121 is a spring loaded arm that is hingedly connected to housing 4122 immediately behind extraction container station 4126. Retention feature 4121 has a retention position and consumable replacement position. In the retention position, as shown in FIG. 12, retention feature 4121 extends over stations 4124 and 4126. In this position, retention feature 4121 is configured to encompass respective perimeters of a pipette tip holder 4060 and an extraction container holder 4020 that are located in their respective stations 4124, 4126 while allowing access thereto via openings in retention feature 4121. In this regard, retention feature 4121 prohibits an extraction container holder 4020 and pipette tip holder 4060 from being inadvertently moved during operation. When consumables in drawer 4120 need to be replaced, drawer 4120 is extended and a locking feature (not shown) that locks retention feature 4121 in the retention position is released. Under the bias of a torsion spring (not shown) located within hinge 4123, retention feature 4121 rotates about hinge 4123 to the consumable replacement position which provides clearance for a user to replenish consumables within drawer 4120.

Processing deck 4014 also includes a single tip drawer assembly 4110 that houses five 96-well tip carriers 4060 and is similarly constructed to drawers 4120 in that it is includes visual indicators on a front end thereof. However, tip drawer assembly 4110 does not include an extractor and is configured to hold multiple tip carriers 4060. These tip carriers 4060 provide both the fourth pipette tip utilized for each sample extraction (conducted in the consumable drawers), along with reagent tips and any excess tips that may be needed due to pick-up failures or clogs. This drawer 4110 sits to the left of the consumable drawers 4120. These drawers 4110, 4120 can be accessed from the front of analyzer 4000 by a user and may be automated in that they are automatically locked or unlocked by analyzer 4000 depending on their present status and the status of the analyzer as a whole.

Reagent Trough Station

Reagent trough assemblies 4050 are located in a reagent trough station which is located between consumable drawers 4120 and orbital shakers 4230. These assemblies 4050 remain in a fixed position. Although reagent trough assemblies 4050 remain in a fixed position and are generally not accessible during operation like consumable drawers 4100, it should be understood that reagent trough assemblies 4050 include sufficient enough reagent that it should not be necessary to access this area during operation.

Waste Chute Separate waste chutes 4210 for amplification plates 4050, pipette tips 4062, and liquid waste extend through processing deck 4014 and communicate with respective waste repositories 4002, 4004. These allow used consumables to be routed to waste repositories 4002, 4004 located below the processing deck. Waste chutes 4210 sit behind tip drawer 4110 toward the back of analyzer 4000.

Sealer

Figure 13A:
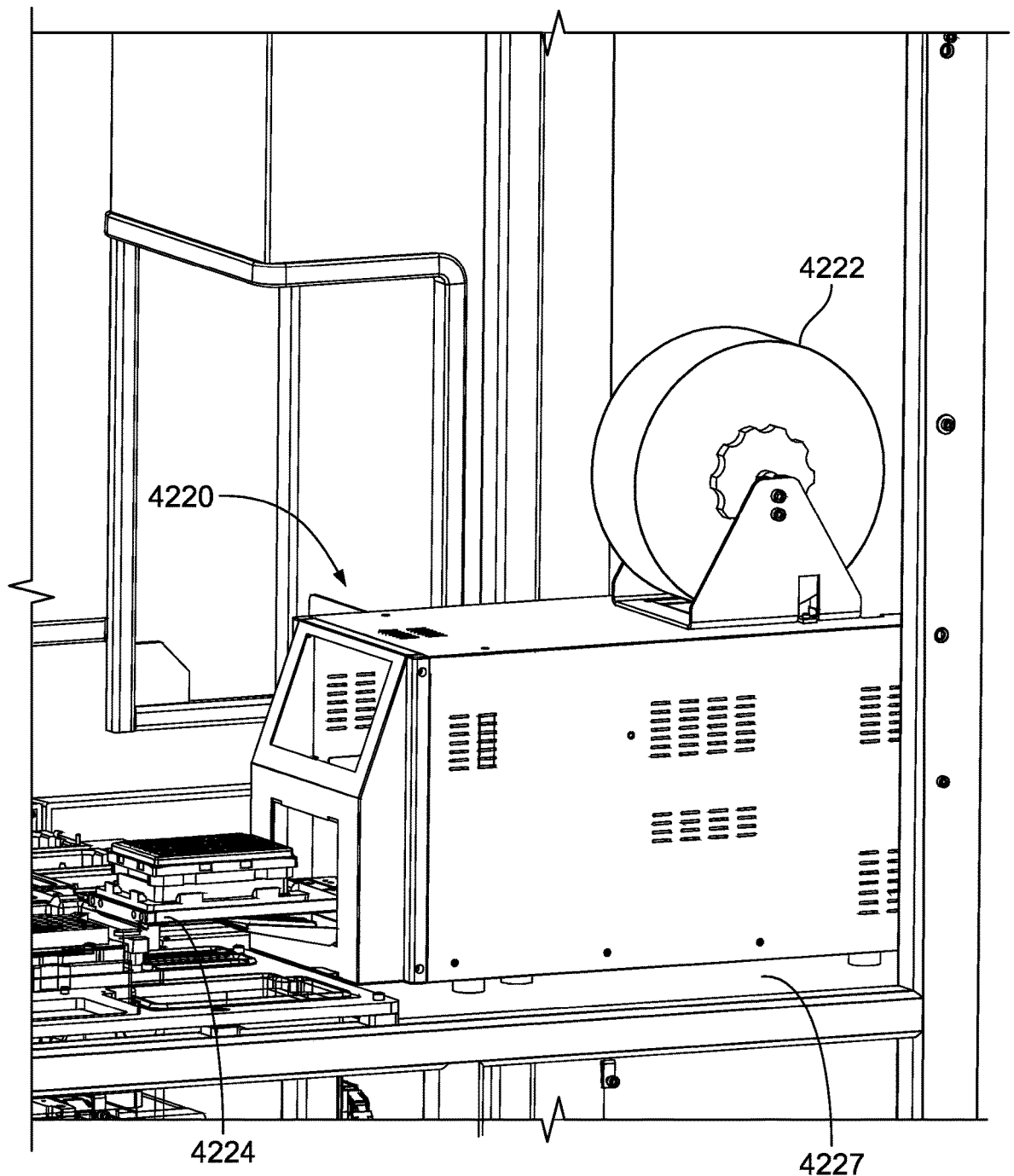
FIG. 13A is a rear perspective view of a plate sealer according to an embodiment of the disclosure.
Figure 13B:
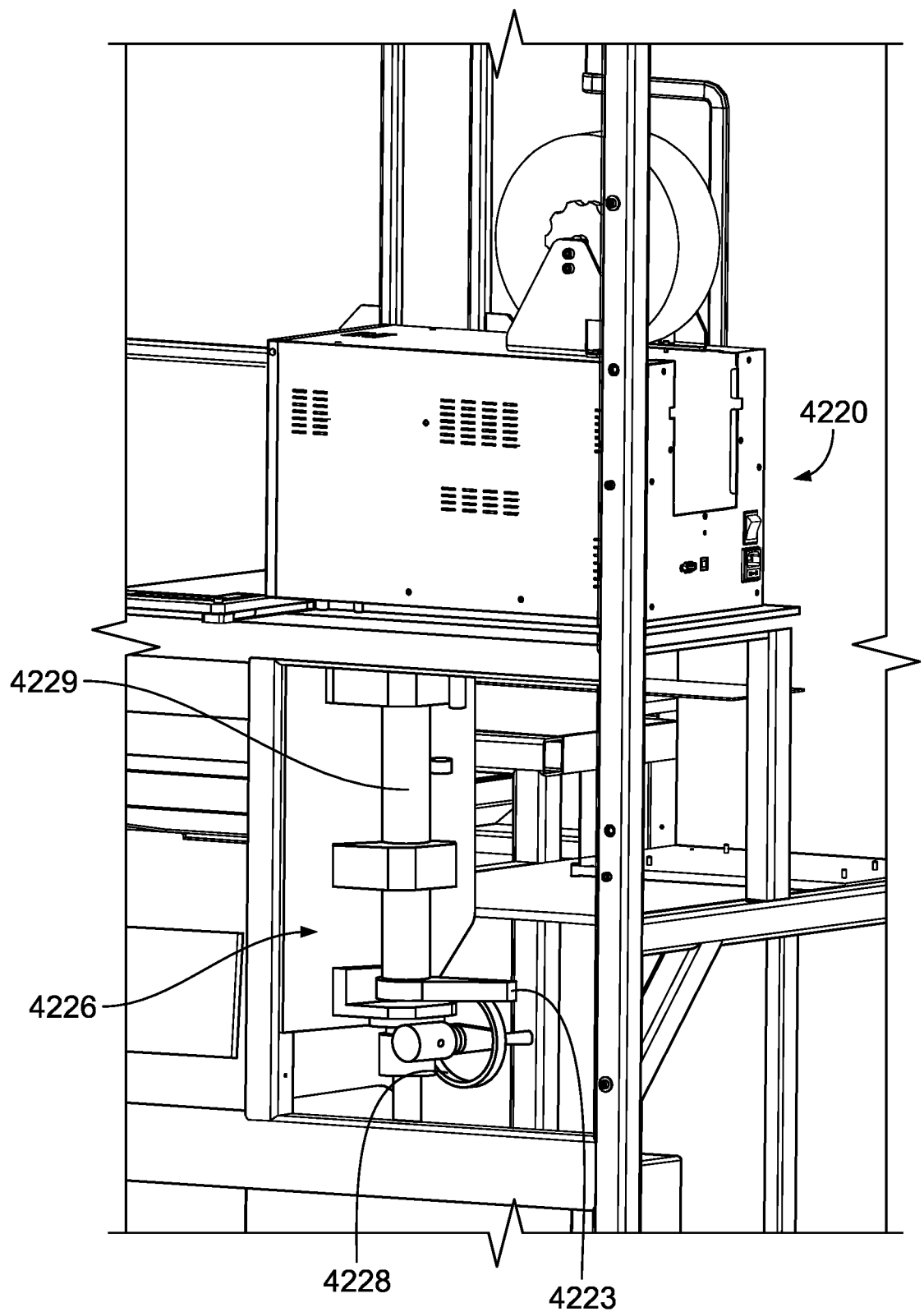
FIG. 13B is a rear perspective view of the plate sealer of FIG. 13A including a lifting and pivoting mechanism.

FIGS. 13A and 13B depict a fully-automated plate sealer 4220 which is located at the rear left corner of the analyzer 4000. Plate sealer 4220 has a moveable platform 4224 that receives an inoculated amplification plate 4040 and moves into plate sealer 4220, best shown in FIG. 13A. Plate sealer 4220 bonds a clear, optical seal to the top of amplification plates 4040. Analyzer 4000 uses automated plate sealer 4220 to seal an amplification plate 4040 following elution and prior to plate mixing and target amplification. In order to provide multi-sealing capability upon a single load, sealer 4220 utilizes a roll-based seal which can be provided by a single roll 4222 of seal material, such as an 800 meter roll, that can be loaded at once. This volume of seal material is sufficient to seal plates 4040 for a full year for most applications. However, plate sealer 4220 may include an optical sensor (not shown) that is configured to sense when the amount of seal material drops beneath a certain threshold level indicating that the seal material should be replaced.

Although plate sealer 4220 is located in the rear of analyzer 4000, it is desirable to be able to access sealer 4220 from the front of analyzer 4000 for replenishment of seal material. The ability to access components in the rear of analyzer 4000 through the front of analyzer 4000 allows analyzer 4000 to be placed directly against a wall in a laboratory, which helps conserve floor space. To facilitate frontal access, plate sealer 4220 may be mounted on a lifting and pivoting mechanism 4226, as best shown in FIG. 13B. The lifting and pivoting mechanism 4226 includes a moveable base 4227 (see FIG. 13A) mounted to a drive shaft (not shown). The drive shaft is surrounded by a rotatable sleeve 4229 which is also connected to moveable base 4227 and is rotatable therewith. When the optical sensor senses that seal material is running low, a user is notified. The user may then manually or automatically operate crank 4228 to raise moveable base 4227 via the drive shaft until it clears the deck surrounding it. In this lifted position, moveable base 4227 is manually or automatically rotated counter-clockwise to present the rear of sealer 4220 to the front of analyzer 4000. This rotation is limited by the presence of a rotational stop arm 4223 which is connected to rotatable sleeve 4229 that surrounds the drive shaft. In this regard, rotational stop arm rotates in unison with sleeve 4229 and base 4227 until stop arm abuts stationary structure thereby preventing further rotation. This helps prevent over-rotation which can result in incidental contact of plate sealer 4220 with other equipment. In this position, the empty or near empty roll 4222 of seal material can be easily reached from the front of analyzer 4000 for replacement. Once a new roll 4222 is attached, sealer 4220 can be rotated clockwise and crank 4228 operated to lower sealer 4220 back into its operating position.

Puncture Tools

Figure 11A:
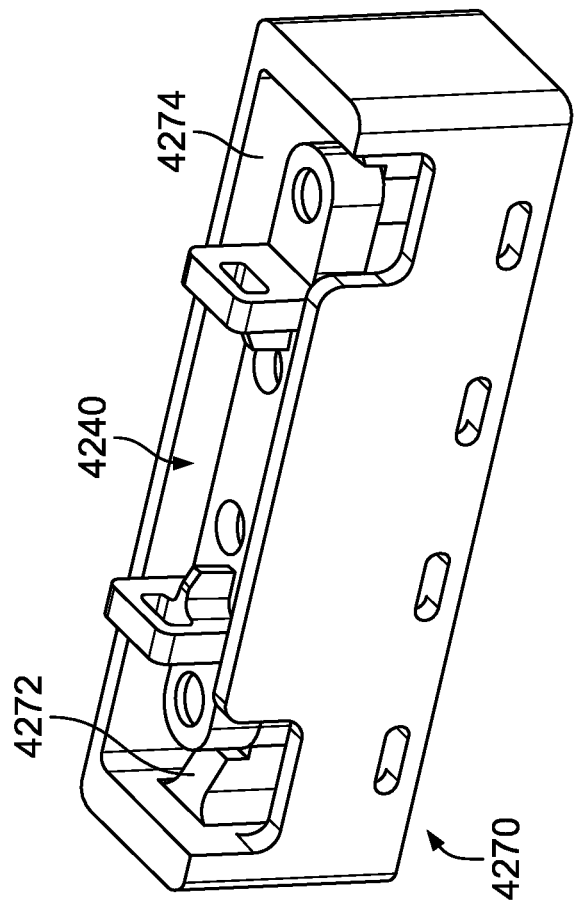
FIG. 11A is a front perspective view of a nest housing a puncture tool according to an embodiment of the disclosure.
Figure 11C:
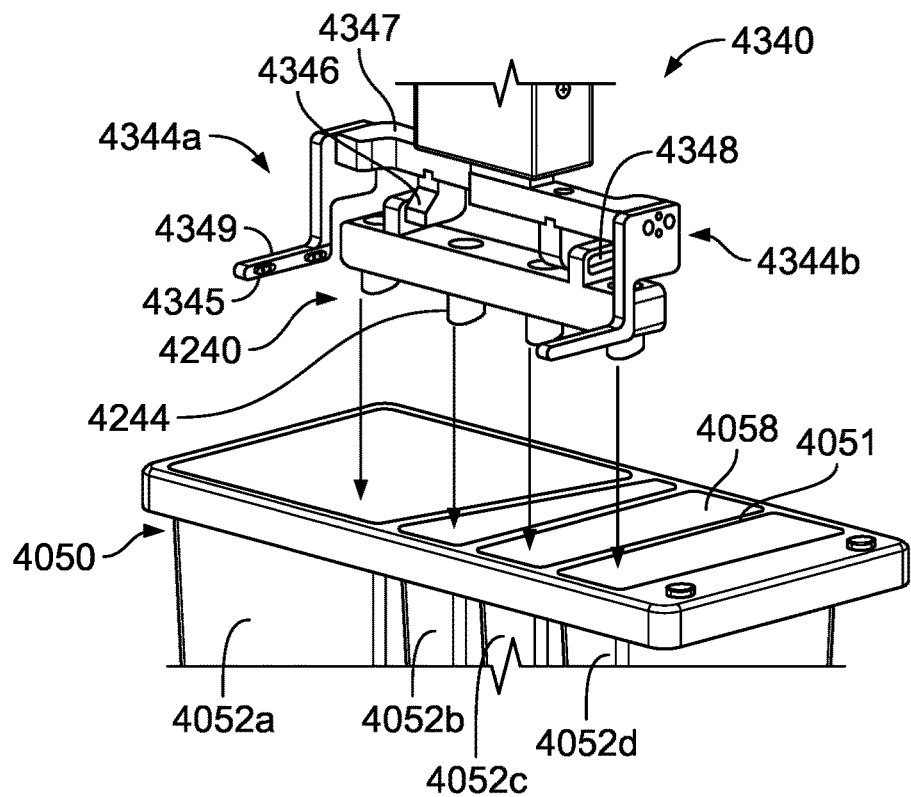
FIG. 11C is a schematic view of the puncture tool of FIG. 11A being used to puncture a seal of a liquid reagent trough assembly.
Figure 11D:
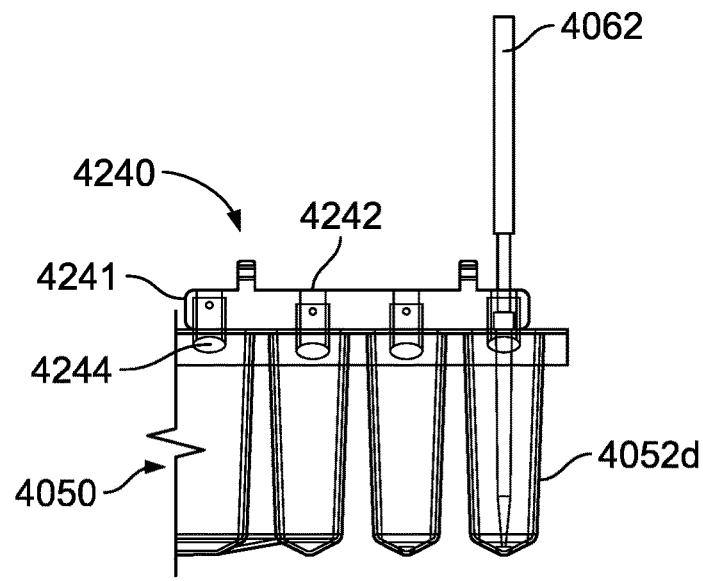
FIG. 11D is a schematic view of the puncture tool of FIG. 11A in relation to a pipette tip and the liquid reagent trough assembly of FIG. 7.

Puncture tool 4240 (see FIGS. 11A-11D) includes a plurality of cannulated puncture members 4244 that extend from a tool body 4241 and have a puncturing end 4246 shaped to puncture the heavy duty seal of reagent trough assemblies 4050. Such cannulated puncture members 4244 may or may not be co-located in a vertical plane parallel to a longitudinal axis of tool body 4241. Cannulated puncture members 4244 define openings 4242 sufficiently large to receive a pipette tip 4062 therein. Tool 4240 also includes a pair of linking members 4248 extending upwardly from body 4241 that have engagement openings 4249 that receive holding members 4346 of a gripper 4340 of robot 4300, as shown in FIG. 11C. Puncture tool 4240 punctures a seal of a reagent trough assembly and is left in place to provide channels through which pipette tip 4062 can aspirate liquid reagents, as best shown in FIG. 11D.

Puncture Tool Nests/Carriers

Two puncture/piercing tools, each associated with a reagent trough assembly 4050, sit within respective nests or carriers 4270 toward the center rear of processing deck 4014 until they are used to puncture a reagent trough assembly 4050. Carrier 4270 includes a platform 4272 that is within a cavity 4274 that houses tool 4240. Platform 4272 has raised side edges that are keyed to the periphery of tool 4240 so that when tool 4240 is placed in carrier 4270, tool 4240 rests on platform 4272 in a precise location as it waits to be picked up by robot 2300, as best shown in FIG. 11A.

Figure 11E:
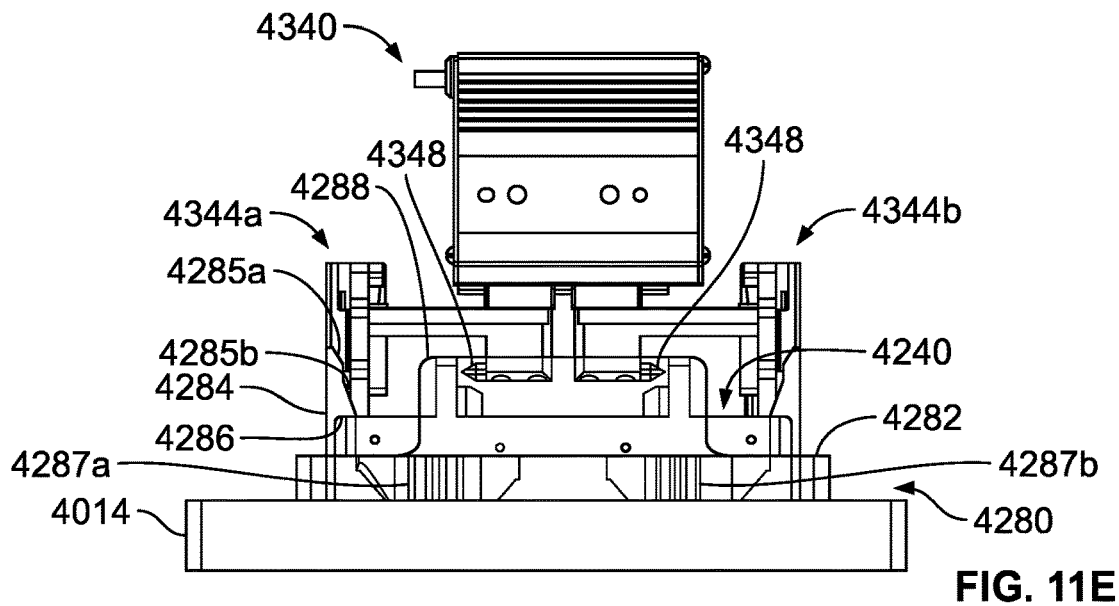
FIGS. 11E-11G depict an alternative puncture tool carrier and a method of moving the puncture tool of FIG. 11A to and from the puncture tool carrier using the robot assembly of FIG. 10A.
Figure 11F:
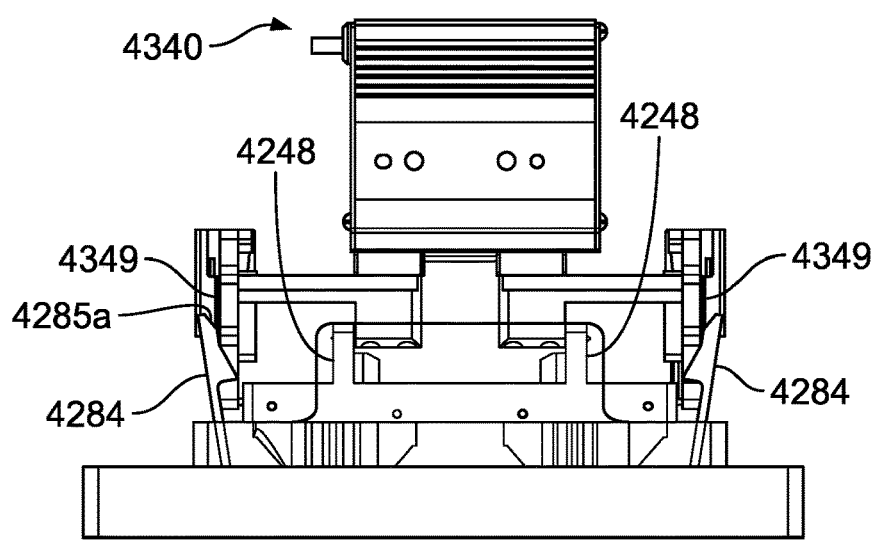
Figure 11G:
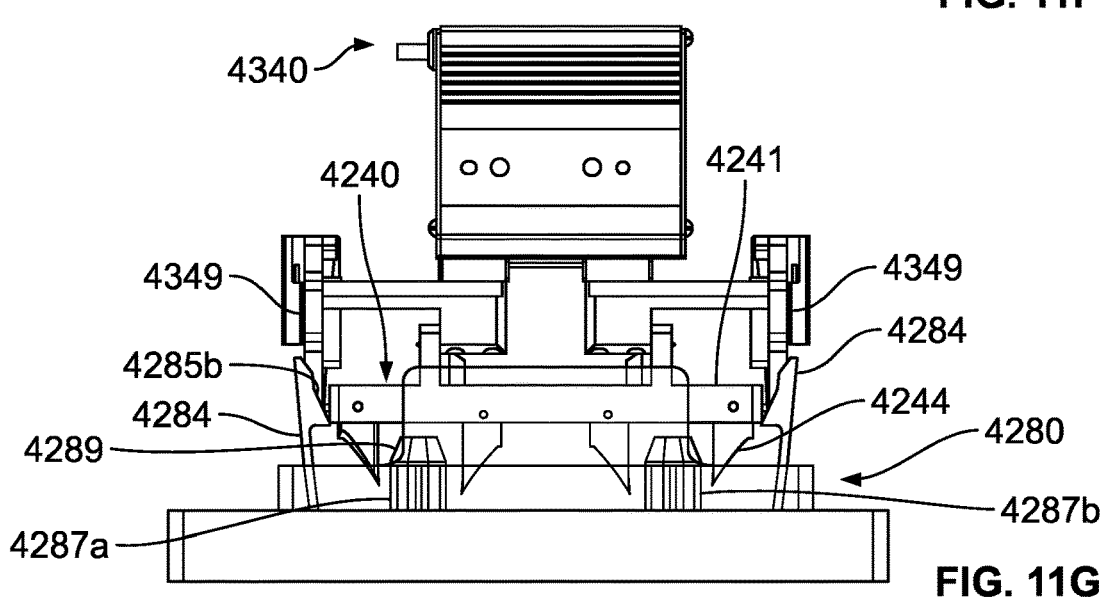

FIGS. 11E-11G illustrate depict an alternative puncture tool nest/carrier 4280. Carrier 4280 includes a base 4282, one or more sidewalls 4288, alignment posts 4287*a-b*, and retaining members 4284. Posts 4287*a-b* extend from base 4282 and have tapered end portions 4289 that are configured to interface with openings (not shown) at a bottom of puncture tool body 4241. Tapered end portions 4289, which are best shown in FIG. 11G, help align tool 4240 within carrier 4280 when placed thereon. The one or more sidewalls 4288 extend from base 4282 generally at a front and back side of carrier 4280 which defines a housing space for tool 4240. As shown, sidewalls 4288 do not extend from base 4282 at left and right sides thereof which provides space for retaining members 4284 to pivot. However, sidewalls extending from a left and right side of base 4282 to further define the housing for puncture tool 4240 are contemplated provided such sidewalls supply enough clearance for movement of retaining members 4284, as described below.

Retaining members 4284 extend from base 4282 and are located at opposite ends of carrier 4280 a distance sufficient to allow puncture tool 4240 to be disposed therebetween. Retaining members 4284 each include one or more beveled surfaces 4285, such as first and second beveled surfaces 4285*a-b*. Beveled surfaces 4285*a-b* face inboard toward a center of carrier 4280. In addition, the second beveled surface 4285*b* is generally positioned more inboard than the first beveled surface 4285*a*. Each retaining member 4284 also has an overhanging surface 4286 that faces base 4282. Retaining members 4284 are movable between first and second positions, such as by a pinned connection to the base 4280, but are biased in the first position, such as by a spring (not shown). In this regard, when retaining members 4284 are in the first position, a puncture tool 4240 supported by carrier 4280 is constrained from vertical movement by overhanging surfaces 4286 of retaining members 4284, as depicted in FIG. 11E. While in the second position, as shown in FIG. 11F, overhanging surfaces 4286 are disengaged from puncture tool 4240. Thus, puncture tool 4240 is no longer constrained by retaining members 4284 and can be lifted from carrier 4280 while retaining members 4284 are in the second position.

Sample Container Retention Assembly

Figure 9A:
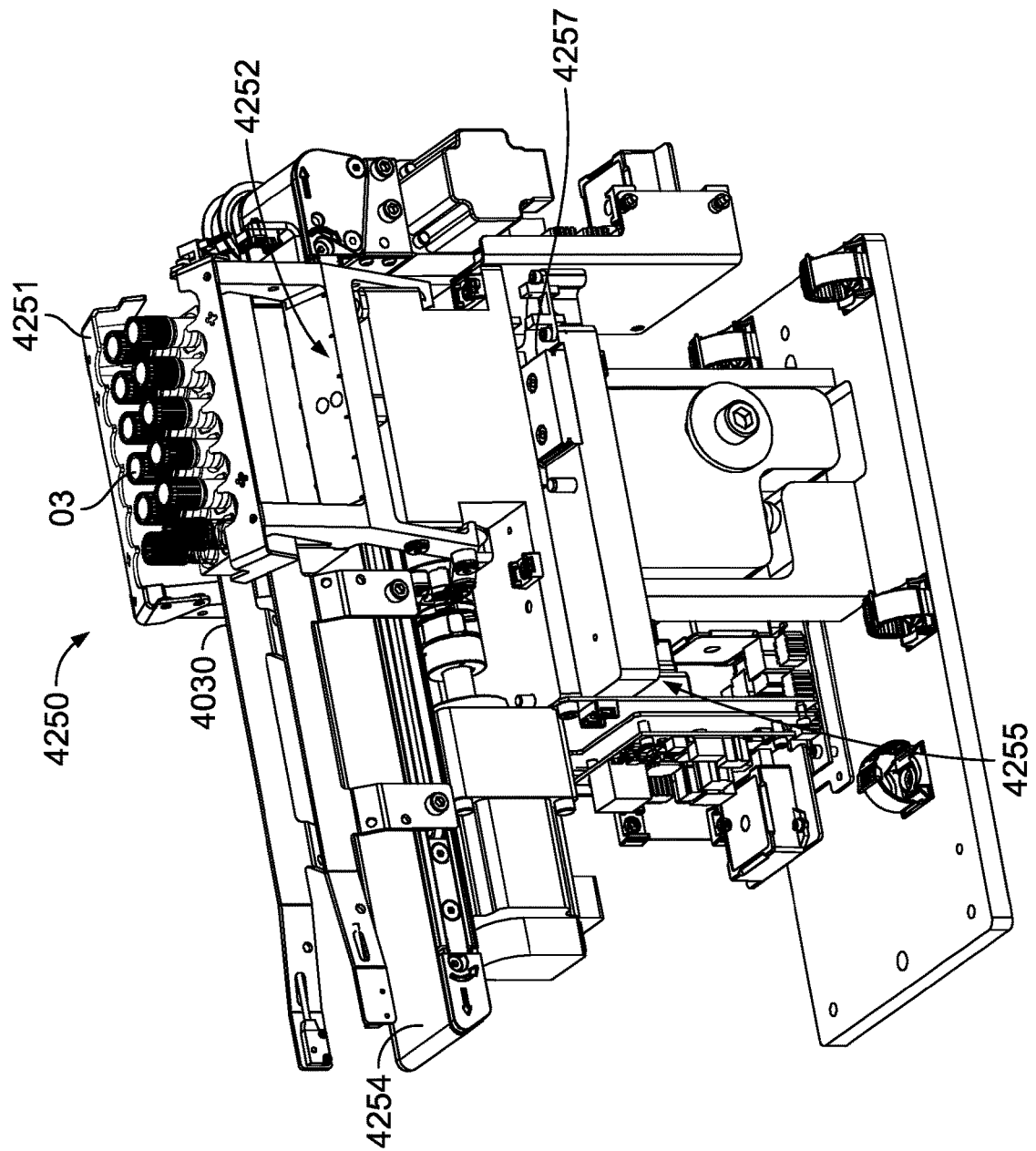
FIG. 9A is a sample container retention assembly according to an embodiment of the disclosure.
Figure 9B:
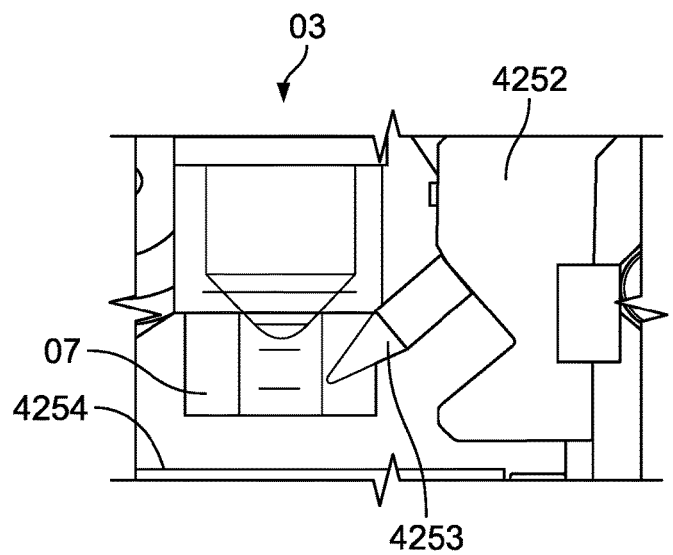
FIG. 9B is a schematic view of the sample container retention assembly of FIG. 9A engaging a sample container.
Figure 9C:
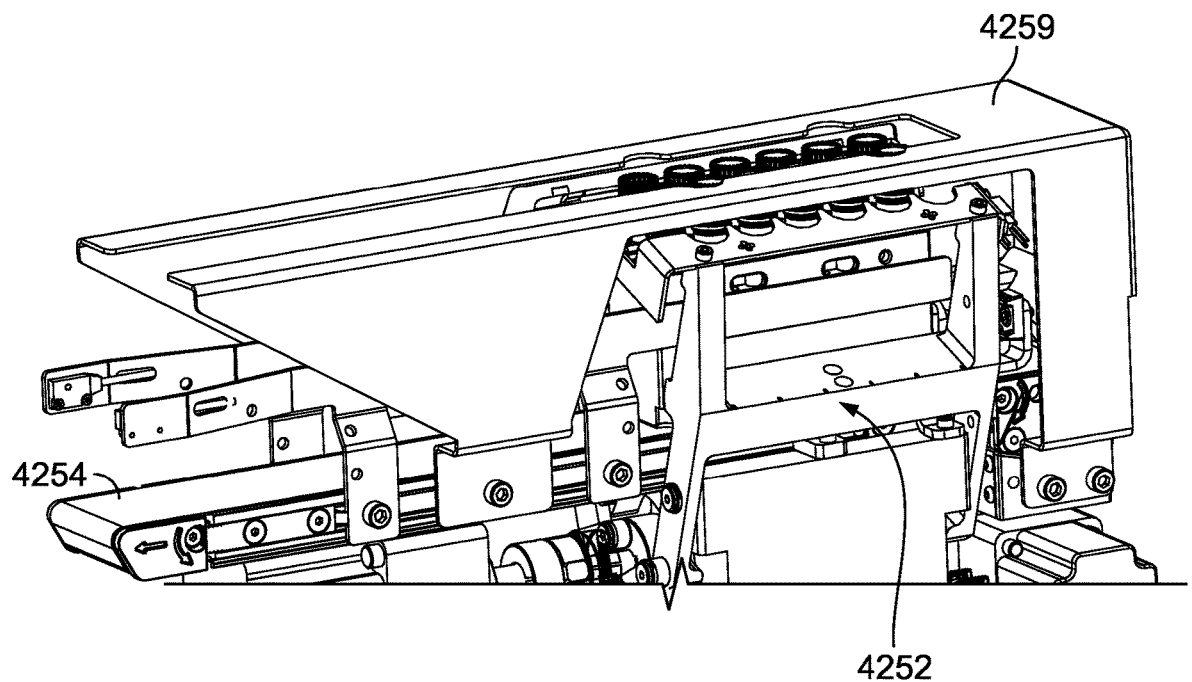
FIG. 9C is a partial perspective view of the sample container retention assembly of FIG. 9A including a drip shroud.

Sample container retention assembly 4250 (FIGS. 9A and 9B) is similar to sample container retention assembly 1100 of the '349 Application in that it includes a clamping assembly 4252 that closes toward a shuttle 4030 disposed within the clamping assembly to retain shuttle 4030 and containers 03 within the shuttle 4030 while aliquots are aspirated from containers 03. In this regard, clamping assembly 4252 includes engagement members 4253 which are configured to project through second transverse openings 4036 in shuttle 4030 when clamping assembly 4250 is closed to engage a skirt 07 at a bottom end of sample containers 03, as best seen in FIG. 11C. These engagement members 4253 penetrate/bite into skirts 07 of respective containers 03 to prevent containers 03 from being inadvertently removed from shuttle 4030 during aspiration. In addition, each clamping assembly 4252 includes a drip shield 4251 connected thereto. Each drip shield 4251 includes a plurality of semicircular notches that are configured to partially receive a sample container 03. In this regard, when clamping assemblies 4252 engage sample containers 03, as shown in FIG. 9A, the drip shields 4251 of the respective clamping assemblies 4252 interface so as to substantially fill the gaps between sample containers 03 which helps prevent sample drippage from falling between containers 03 and onto shuttle 4030 or conveyor 4254. To provide further drip protection, a drip shroud 4259 may cover clamping assembly 4250 except directly above sample containers 03 and conveyor 4254, as best shown in FIG. 9C. Drip shields 4251 and drip shroud 4259 provide easy-to-clean surfaces in the event of sample drippage.

In addition, sample container retention assembly 4250 includes a conveyor belt 4254 that receives a shuttle from pre-analytical system 10 and moves it into position between clamping assembly 4252. In this regard, conveyor belt 4254 receives a shuttle 4030 from an output lane of the shuttle transport assembly 300 of pre-analytical system 10. When it is time to return shuttle 4030 to pre-analytical system 10, a motor 4256 operates a drive mechanism (not shown) that slides retention assembly 4250 along a track 4257 on a suspended platform 4255 so that conveyor 4254 aligns with an output lane of the shuttle transport assembly 300. Conveyor 4254 operates in two directions so as to receive and return shuttle 4030.

Orbital Shaker

Figure 14:
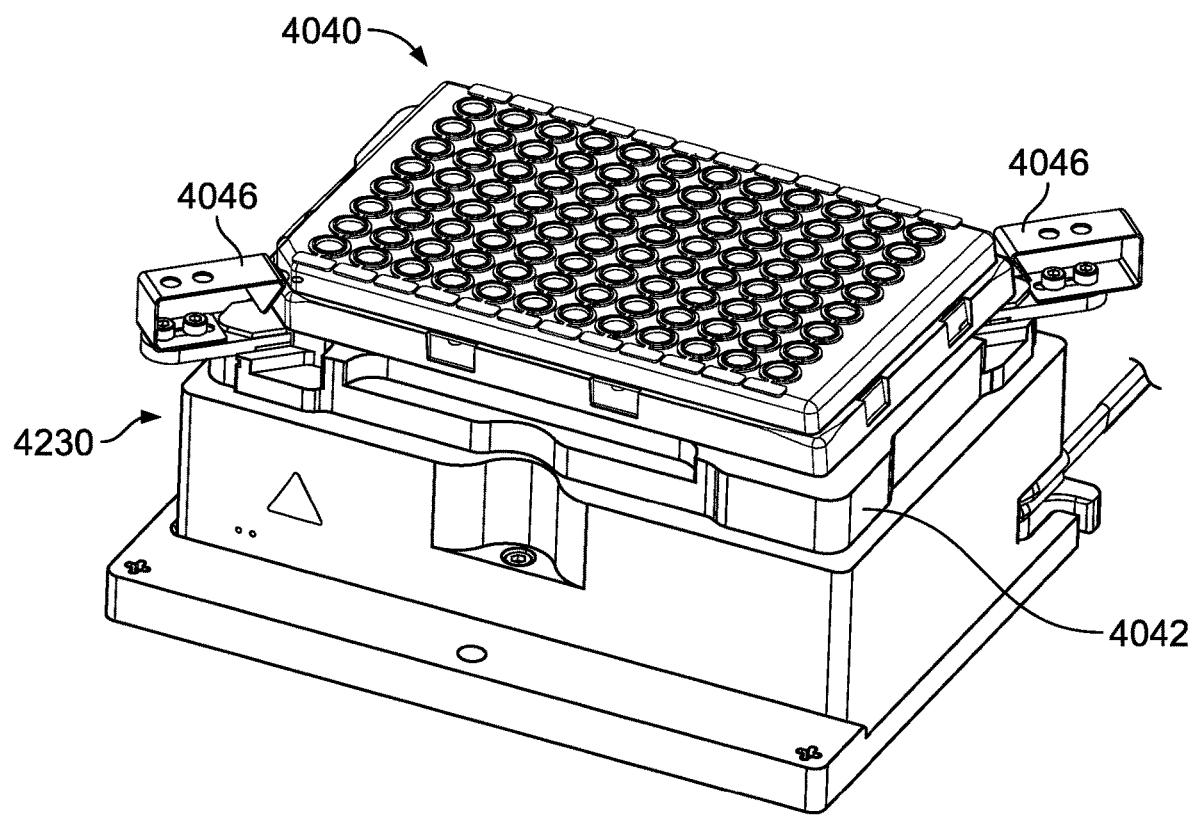
FIG. 14 is a front perspective view of an orbital shaker according to an embodiment of the disclosure.

Orbital shakers 4230 (see FIG. 14) oscillate sealed amplification plates 4040 in a circular motion to fully rehydrate a dried down reagent mixed with an eluted sample within the compartments 4045 of the sealed amplification plate 4040. Two of these are positioned at the center rear of analyzer 4000 behind extraction reagent troughs 4050. Of course more or less could be provided as needed. Orbital shaker 4040 includes a platform 4042 upon which amplification plate 4040 rests and includes at least two automated arms 4046 that are configured to hold plate 4040 on platform 4042 during operation. In this regard, arms 4046 may be positioned at corners of platform 4042 and may move inwardly in a radial direction to hold amplification plate 4040 in position and outwardly in a radial direction to release amplification plate 4040 for pick up by robot 4300.

Detector/Reader

Two detector/readers 4260*a-b* are located at opposite ends of analyzer 4000 and have cavities that face the center of analyzer 4000. These readers 4260*a-b* are similar to the readers utilized in the Viper™ LT System. In this regard, readers 4260*a-b* have a housing that receives sealed amplification plates 4040. Readers 4260*a-b* also have a thermocycler that are used to amplify a target analyte within amplification plates 4040, and a detector that detects the target analyte using a set of LED illuminators, for example Robot As depicted in FIGS. 10A-10F, multipurpose robot 4300 is suspended at the robot deck 4016. Multipurpose robot 4300 is an automated system for mass transfer and optical interrogation (e.g., barcode reading) that hangs above processing deck 1014 and includes a Cartesian robot 4301 which carries a payload.

Cartesian robot 4301 includes two linear rails 4302*a-b* mounted orthogonally. Each of the two linear rails 4302*a-b* has at least two optical limit sensors (not shown) to ensure the payload 4306 is not driven to their extent and to facilitate initialization. Because of the size of payload 4306 and the fact that it hangs near processing deck 4014, there are potential collisions that are desirably avoided. To help prevent collisions, a third optical sensor on first linear rail 4302*a* is provided. This allows robot 4300 to instantaneously sense which half of the analyzer (left/right) it is located, ensuring that the center of analyzer 4000 can be found and a safe start-up and initialization procedure can be used.

Payload and Rotational Stage

Robot payload 4306 sits beneath Cartesian robot 4301 and provides vision, pipetting and plate transfer functionality. In this regard, payload 4306 includes a rotational stage 4310, vision system 4320, gripper module 4340, multichannel pipettor 4350, and a backplane connector 4360. Robot payload 4306 is connected to Cartesian robot 4301 via rotational stage 4310. Rotational stage 4310 can rotate payload 4306 about 180 degrees about a vertical axis which provides movement flexibility to gripper 4340, pipettor 4350 and vision system 4320.

Consumable Handling Portion

Vision System

Vision system 4320 and gripper 4340 comprise a consumable handling module 4320. Vision system 4320 can be any conventional vision system that is capable of reading barcodes and performing other machine vision tasks. An exemplary vision system includes the In-Sight 5600 vision system (Cognex Corporation, Natick, Mass.). This vision system 4320 is affixed to the vertical stage 4322 along with gripper 4340 allowing vision system 4320 to be moved up and down along with gripper 4340 and allowing vision system 4320 to focus on a target. Such movement along vertical stage is performed by motor 4330.

Gripper

Gripper module 4340 sits on an opposite side of backplane connector 4360 from multichannel pipettor 4350. Gripper module 4340 includes, as mentioned, is connected to vertical translation stage 4322 that varies the height of the gripper 4340 and arms 4344*a-b* that translate horizontally relative to each other to engage a consumable item. Such arms 4344 have gripper fingers 4349 (see FIG. 11C) that may have engagement features or protrusions 4345 that project sideways therefrom and that are used to help secure a consumable item that has corresponding engagement notches (see FIG. 11C). Gripper 4340 also includes holding members 4346 that project downwardly from horizontal members 4347 of each arm 4344*a-b* (see FIG. 11C). Such holding members 4346 each include a sideways projecting member 4348 that is configured to be received by an engagement opening 4249 in linking members 4248 of puncture tool 4240. As each arm 4344 is capable of moving relative to each other, each holding member 4346 is capable of moving relative to the other holding member. This allows holding members 4346 to engage linking members 4248 so as to firmly secure puncture tool 4240 during a puncture operation, and to also disengage puncture tool 4240 so as leave it in place within carrier 4270, 4280 or atop liquid reagent trough assembly 4050. Similar to the movement of the gripper arms described elsewhere herein, the holding members are capable of relative lateral movement such that they are laterally farther apart in one position and laterally closer together in another position.

FIG. 10E depicts an alternative gripper module 4340'. Gripper module 4340' is similar to gripper module 4340 in that it includes gripper arms 4344*a'-b'* which include protrusions 4345. However, gripper module 4340 also includes presence sensors 4341 that are configured to detect the presence of a consumable item between gripper arms 4344*a'-b'*. For example, as shown, each arm 4344*a'* and 4344*b'* includes a sensor 4341 that is a switch-type sensor. Such sensor 4341 is positioned so that it can be deflected by a consumable item, such as plate 4040, as gripper arms 4344*a'-b'* grip such consumable item therebetween. Thus, as long as gripper arms 4344a'-b' grip the consumable item so that a sensor 4341 is deflected, its presence is detected. However, when gripper arms 4344a'-b' release their grip, sensor 4341 returns to its normal position indicating that no consumable item is present. Although a deflectable, switch-type sensor is shown. Other sensors are contemplated, such as optical sensors, for example.

A method of puncturing liquid reagent trough assembly 4050 is depicted in FIGS. 11E-11G and also 11C-11D. As shown in FIG. 11E, puncture tool carrier 4280 Is mounted to processing deck 4014 and puncture tool 4240 is retained in carrier 4280 by retaining members 4284 which are in the first position. Such a carrier 4280 may be located in the back right corner of system 4000 adjacent to the orbital shakers 4230 shown in FIG. 8B. Multipurpose robot 4300 moves to the puncture tool carrier 4280 and lowers the gripper module 4340 to a height above puncture tool 4240 so that projecting members 4348 of gripper are aligned with engagement openings 4249 (see FIG. 11B for openings) of puncture tool 4240, which is best shown in FIG. 11E.

While in this position, gripper arms 4344a-b are moved apart so that projecting members 4348 are received in corresponding engagement openings 4249. As this occurs, gripper fingers 4349 engage retaining members 4284 at first beveled surface 4285a, or adjacent thereto, so as to overcome their bias and push the retaining members 4284 outwardly toward the second position, as best shown in FIG. 11F. This provides clearance for puncture tool 4240 to be lifted from contact with carrier 4280. Thus, with the retaining members 4284 being held in the second position by fingers 4349 and with projections 4348 engaging openings 4249, puncture tool 4240 is removed from carrier 4280 via gripper module 4340 until puncture tool body 4241 clears overhanging surface 4286 of retaining members 4284.

Once puncture tool 4280 clears retaining members 4284, multipurpose robot 4300 moves gripper module 4340 and puncture tool 4280 toward a liquid reagent trough assembly 4050 which may be positioned in front of tool carrier 4280 and more toward the center of system 4000, as shown in FIG. 8B. Robot 4300 then positions puncture tool 4280 over trough assembly 4050 so that cannulated puncture members 4244 are each aligned with a respective trough 4052a-d, as best shown in FIG. 11C. Thereafter, gripper module 4340 lowers puncture tool 4240 so that puncture members 4244 puncture lidding material 4058. When lidding material 4058 is fully punctured, tool body 4241 sits on the walls 4051 that separate each trough 4052a-d. Such walls 4051 support the weight of puncture tool 4240. Cannulated puncture members 4244 have a length sufficiently long to penetrate entirely through lidding material while being sufficiently short to position puncture members 4244 entirely above the surface of whatever reagent is located in the respective troughs 4052a-d. In addition, cannulated puncture members 4244 provide uniform openings 4242 that are sufficiently large to allow easy passage of a pipette tip 4062. This helps prevent incidental contact with the lidding material 4058 that could jostle a quantity of reagent free of pipette tip 4062 as pipette tip 4062 is used to draw reagent from trough assembly 4050.

Once lidding material 4058 is punctured and tool 4240 is well supported by trough assembly 4050, gripper module 4340 releases its grip on tool 4240 by moving arms 4344a-b toward each other so that projections 4348 are removed from openings 4249. Thereafter, the robot 4300 carries payload 4310, which includes gripper module 4340, away from trough assembly 4050. In this regard, payload 4310, which also includes pipettor 4350, may move to a location of unused, disposable pipette tips 4062 which may be located in the tip drawer 4110 shown in FIG. 8B. Thereafter, pipettor 4350 is lowered so as to retrieve one or more pipette tips 4062. Robot 4300 may then move pipettor 4350 over puncture tool 4240 and trough assembly 4050 so as to align pipette tip 4062 with an opening 4242 of tool 4240. The pipette tip 4062 is then lowered into the selected trough 4052, as shown in FIG. 11D, through the corresponding opening 4242 so as to aspirate reagent from the trough 4052. The aspirated reagent may then be carried to another location within system 4000 as needed. The reagent is then dispensed into an appropriate container and the pipette tip 4062 is disposed of. The retrieval of a pipette tip 4062, aspiration of a reagent through puncture tool, and disposal of the pipette tip 4062 may occur multiple times over until the reagent is depleted. System 4000 keeps track of the amount of reagent remaining and will alert a user when such reagent needs to be changed. This is described elsewhere herein.

When puncture tool 4240 is returned to carrier 4280, such as when liquid reagent trough 4050 needs to be replaced or for some other reason, robot 4300 moves gripper module 4340 over puncture tool 4240 which is resting on reagent trough assembly 4050 and engages puncture tool 4240 by moving projections 4348 into openings 4249, as previously described. Once puncture tool 4240 is engaged by gripper assembly 4340, robot 4300 carries puncture tool 4240 away from reagent trough assembly 4050 to a position above carrier 4280. Gripper assembly 4340 is then lowered so that puncture tool body 4241 contacts one or more of beveled surfaces 4285a-b. As puncture tool 4240 is lowered toward carrier 4280, puncture tool body 4241 slides along one or more of beveled surfaces 4285a-b which pushes retaining members 4284 outwardly from the first position to the second position, as best shown in FIG. 11G. With retaining members 4284 positioned to provide clearance for puncture tool 4240, puncture tool 4240 is further lowered so as to engage posts 4287a-b which aligns puncture tool 4240 relative to carrier 4280. Near the bottom of the descent of puncture tool 4240, gripper fingers 4349 may also engage retaining members 4284 at or adjacent to beveled surface 4285a to help keep them in the second position, which is illustrated in FIG. 11F. Once tool 4240 is fully seated on carrier 4280, gripper arms 4344a-b are moved laterally toward each other which disengages projecting members 4348 from puncture tool 4240 and also disengages gripper fingers 4349 from retaining members 4284. Said another way the pair of gripper arms move laterally from a first position in which the arms are further apart to a second position in which they are closer together. The gripper fingers engage and push back on the retaining members in the farther apart position and do not engage retaining members when in their closer together position. In this regard, retaining members 4284 return to the first position shown in FIG. 11E under their own bias, thereby retaining puncture tool 4240 until it is needed again.

Multi-Channel Pipettor

Multichannel pipettor 4350 is connected to backplane connector 4360 at an opposite side thereof than consumable handling portion. Multichannel pipettor 4350 includes a plurality of liquid handling assemblies 4352a-e that directly connect to backplane connector 4360. In the embodiment depicted, there are five liquid handling assemblies 4352: a first liquid handling assembly 4352a, a second liquid handling assembly 4532b, third liquid handling assembly 4532c, a fourth liquid handling assembly 4532d, and a fifth liquid handling assembly 4532e. Each liquid handling assembly 4532 includes a main board assembly 4370 and a pipette assembly 4380. Liquid handling assemblies 4352a-e are connected to backplane connector 4360 adjacent to one another in close proximity.

Each main board assembly 4370a-e helps provide data, power and positive/negative air pressure to a corresponding pipette assembly 4380a-e. In the embodiment depicted, there are five pipette assemblies 4370a-e. Each main board assembly 4370a-e is similar to the main board assembly 1401 described and shown in FIGS. 27A and 27B of the '349 Application. In this regard, each main board assembly 4370a-e includes a housing 4372 with various components disposed therein, such as a PCB, positive and negative pressure inputs, a valve, and a liquid/gas conduit in communication with the inputs and valve. Main board assemblies 4370a-e also includes a z-drive mechanism that includes a vertical rail 4374 on one side of housing 4372 and a motor 4376 and drive shaft (not shown). The drive shaft is disposed within housing 4372.

One of the pipette assemblies 4380a-e is reserved for clean reagent transfers, and, thus, a pipette tip 4062 carried by such reserved assembly 4380 is never contaminated by sample. This allows a single reagent tip 4062 to be used for the entire extraction process, minimizing the number of tips required for an assay workflow. As each pipette assembly 4380a-e is capable of traveling independently in a z-direction, pipette tip 4062 from such reserved pipettor 4380 can be independently inserted through channels 4242 of piercing tool 4240 and into the appropriate liquid-containing reservoir of plate 4050, as best shown in FIG. 11. There is no contact between pipette tip 4062 and a solid surface.

Each pipette assembly 4380a-e is similar to the pipette assembly 502 of FIGS. 17A-17D and pipette assembly 1402 of FIGS. 27A and 27B of the '349 Application with the exception that each pipette assemblies 4380a-e is not hingedly connected to its respective main board assembly 4370a-e and does not rotate into multiple hinge positions. Each pipette assembly 4380a-e is constrained from rotation and moves in a vertical z-direction along vertical rail 4374 via motor 4376. Thus, the first, second, third, fourth, and fifth pipette assemblies 4380a-e are capable of moving independently in a vertical or z-direction. Otherwise pipette assemblies 4380a-e are constructed similarly to pipette assemblies 502 and 1402 particularly with regard to its pipette channel assembly (not shown) and pipette tip ejector assembly.

Backplane connector 4360 is similar to the backplane connector 1600 of FIGS. 29A and 29B of the '349 Application with the exception that backplane connector 4360 is configured to have multiple liquid handling assemblies 4352a-e and consumable handling assembly 4320 connected thereto. In this regard, backplane connector 4360 connects to main board assemblies 4370a-e of each liquid handling assembly 4352a-e and to corresponding electronic boards that operate consumable handling portion. Backplane connector 4360 includes several input and output connectors (not shown), such as Ethernet, multi-pin, positive pressure input, and negative pressure input connectors for supplying the consumable handling module 4320 and liquid handling assemblies 4352a-e with the requisite power, pressure, and data signals. This helps reduce or eliminate external cabling that could snag and can be difficult to manage with multiple liquid handling assemblies 4352a-e being connected in such close proximity. The requisite inputs can be provided to backplane connector 4360 via rotational stage 4310. In this regard, backplane connector 4360 may act as a manifold for air pressure and other inputs/outputs.

Figure 15:
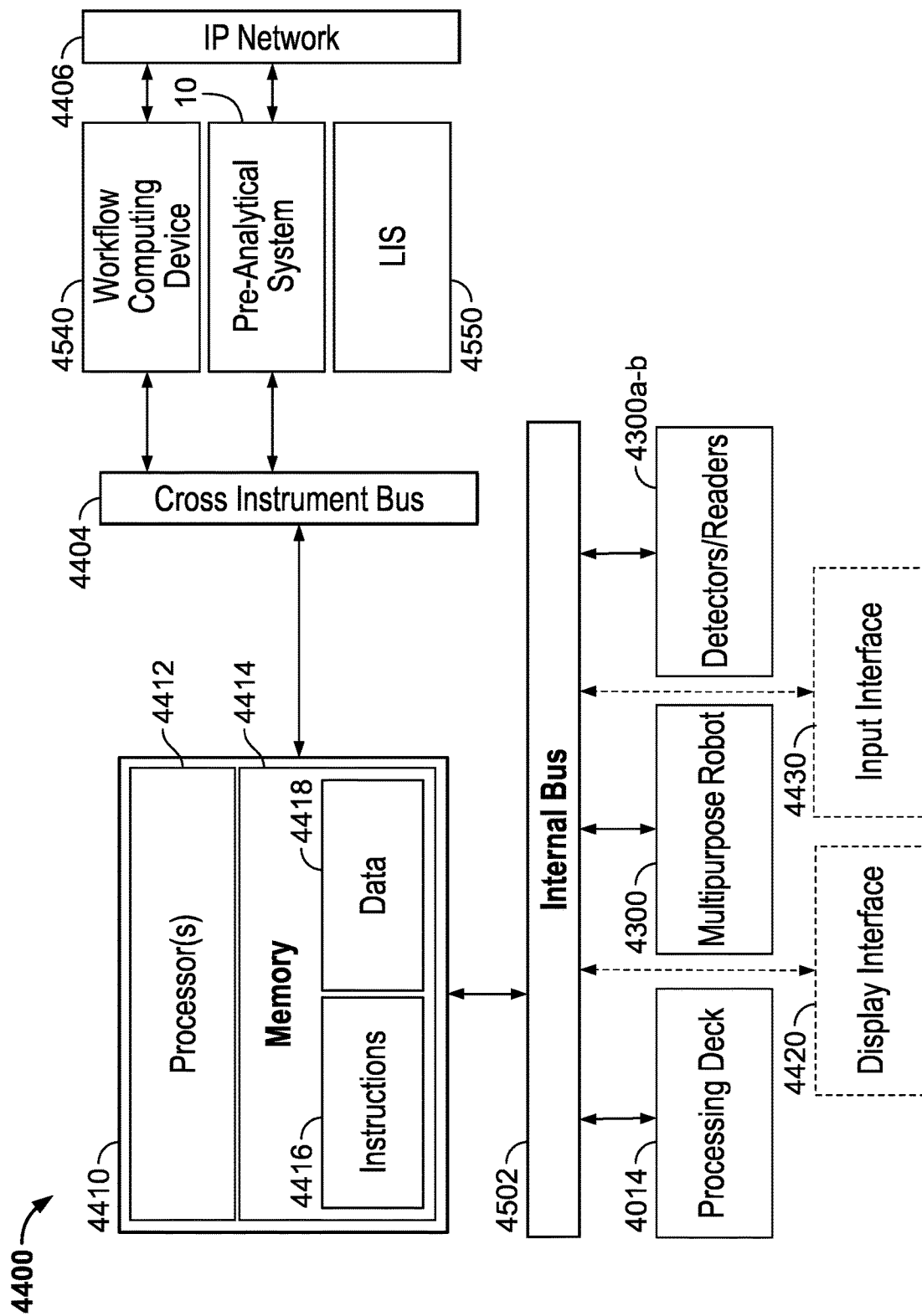
FIG. 15 is a block diagram of an exemplary architecture of a computing system involving the analyzer of FIG. 2 including example components suitable for implementing methodologies of the present disclosure.

FIG. 15 depicts a general architecture of a computing system of analyzer 4000. Computing system may be a subsystem within system 1300 of FIG. 26 of the '349 Application which depicts a computing system diagram of the high-throughput system 00. In this regard, cross instrument bus 4404 and work flow computing device 4540 are the same as bus 1320 and computing device 1330 depicted in FIG. 26 of the '349 Application. In addition, computing device 4410 is similar to computing device 1360 and is described in more detail herein along with its inputs and outputs within analyzer 4000.

Computer Control Device & Processor

Computer control device 4400 may be any general purpose computer and may contain a processor 4412, memory 4414 and other components typically present in general purpose computer control devices. Although computer control device 4410 can include specialized hardware components to perform specific computing processes. Processor 4412 may be any conventional processor, such as a commercially available CPU. Alternatively, processor 4412 may be a dedicated component such as an application specific integrated circuit ("ASIC") or other hardware-based processor.

Memory 4414 may store information accessible by processor 4412, including instructions 4416 that can be executed by processor 4412. Memory 4414 can also include data 4418 that can be retrieved, manipulated or stored by processor 4412. Memory 4414 can be of any non-transitory type capable of storing information accessible by processor 4410, such as a hard-drive, memory card, ROM, RAM, DVD, CD-ROM, write-capable, and read-only memories.

Instructions 4416 can be any set of instructions to be executed directly, such as machine code, or indirectly, such as scripts, by processor 4412. In that regard, the terms "instructions," "application," "steps," and "programs" can be used interchangeably herein. Instructions 4416 can be stored in object code format for direct processing by processor 4412, or in any other computing device language including scripts or collections of independent source code modules that are interpreted on demand or compiled in advance.

In one embodiment of analyzer 4000, computing device 4410 may include several sets of instructions 4416. For example, each assay to be performed may have several sets of instructions associated with it which may include instructions that operate multipurpose robot 4300 to optically scan consumables, grip and move consumables, and aspirate liquid samples.

Data 4418 can be entered and viewed through a graphical user interface ("GUI") which may be displayed on display interface 4420 which is specifically associated with analyzer 4000, or display interface 1332 of FIG. 1 and FIG. 26 of the '349 Application which is associated with the entire high-throughput system 00. Data 4418 can also be entered from vision system 4320 of multipurpose robot 4300 or scanners within pre-analytical system 10. Data 4418 can also be obtained by sensors door sensors, temperature sensors and the like, to obtain information regarding certain conditions and activities occurring within analyzer, such as the location of particular consumables and air quality, for example.

This data 4418 can be digitally tagged to particular identification codes (e.g., barcode serial numbers) in a field implemented or relational database, which may also be stored in memory 4414. This helps analyzer 4000 keep track of various consumables within analyzer 4000 and helps provide certain information to processor 4412 during the execution of processor instructions 4416 without the need for user input. For example, amplification plate 4050 may have an identification code which may be associated with a bar code located on an outer surface thereof which may be tagged in the database with certain stored data such as the type of reagents stored therein and which reagents have already been utilized. This allows analyzer to check its inventory to determine when reagents and other consumables are running low or are insufficient to perform additional assays. In another example, a shuttle 4030 may have an identification code which may be tagged in the database with certain stored data such as data involving each of the sample containers 03 carried by shuttle 4030 such as patient name, assay to be performed, processing parameters and the like. In a further example, when analysis is completed, the result of the assay can be associated with the particular sample within the database so that a user can easily retrieve the results via access to the workflow computing device 4540 as such results may be communicated thereto by device 4410.

Although FIG. 15 functionally illustrates processor 4412, memory 4414, and other elements of computer control device 4410 as being within the same block, computer control device 4410, processor 4412, and/or memory 4414 can be comprised of multiple processors, computer control devices, and memories, respectively, which may or may not be stored within the same physical housing. For example, memory 4414 can be a hard drive or other storage media located in housings different from that of computer control devices 4410. Accordingly, references to processor 4412, computer control device 4410, and memory 4414 should be understood to include references to a collection of processors, computer control devices, and memories that may or may not operate in parallel.

Display Interface

Display interface 4420 may be associated specifically with analyzer 4000 and may only display information regarding analyzer 4000 and may also be integrated into the structure of analyzer 4000. However, display interface 4420 is optional (indicated by dashed lines in FIG. 15) and, in the embodiment depicted in FIG. 1, is not included as the overall system display interface 1332 is utilized instead. However, where display interface 4420 is included, interface 4420 may be a monitor, LCD panel, or the like coupled to a front panel of housing 4010 or located remote from analyzer 4000. Display interface can display a GUI, user prompts, user instructions and other information that may be relevant to a user.

Input Interface

User control/input interface 4430 allows a user to navigate the GUI, and again, may be optionally provided as a separate component from the overall system input interface which is provided by display interface 1332 of FIG. 1. However, where user control/input interface 4430 is provided, such interface can be a touch panel, keyboard, or mouse, for example. In addition, input interface 4430 can be integrated into display interface 4420 such that the same device that displays prompts and the like is the same device that allows a user to respond to said prompts.

As depicted in FIG. 15, computer control device 4410 may be connected to workflow computing device 4540 which is utilized to integrate all of the components of high-throughput system 00 such as the first analyzer 2000 and pre-analytical system 10 and to integrate with a particularly laboratory's laboratory information system ("LIS") 4550. Thus information relevant to analyzer 4000 originating within pre-analytical system 10 can be communicated to analyzer 4000 via workflow computing device 4540. Similarly, information relevant to pre-analytical system 10 that originates in analyzer 4000 may be communicated via computer control device 4540 to workflow computing device 4540 which communicates that information to pre-analytical system 10. Such information can also be supplemented with information obtained from the LIS 4550 by workflow computing device 4540, such as patient information and the like.

Computer control device 4410 is also connected to multiple components within analyzer 4000 to share information back and forth such as instructions and data. Some of the components that are connected with computer control device via internal bus 4502 include several of the components previously described that are on located on the processing deck, such as the plate sealer and orbital shakers. In addition, computer control device may be connected to detector/readers 4260a-b and multipurpose robot 4300. Such connections with computer control device 4410 allows computer control device 4410 to provide instructions to such components and receive information therefrom. For example, multipurpose robot 4300 may receive instructions from computer control device 4410 to retrieve and apply puncture tool 4240 to a reagent trough assembly 4050 or to pick up and move an amplification plate 4040 from one location to another. Thus operations performed by the internal components of analyzer 4000 are generally as a result of instructions provided by processor 4410 as analyzer 4000 is fully automated.

Figure 16:
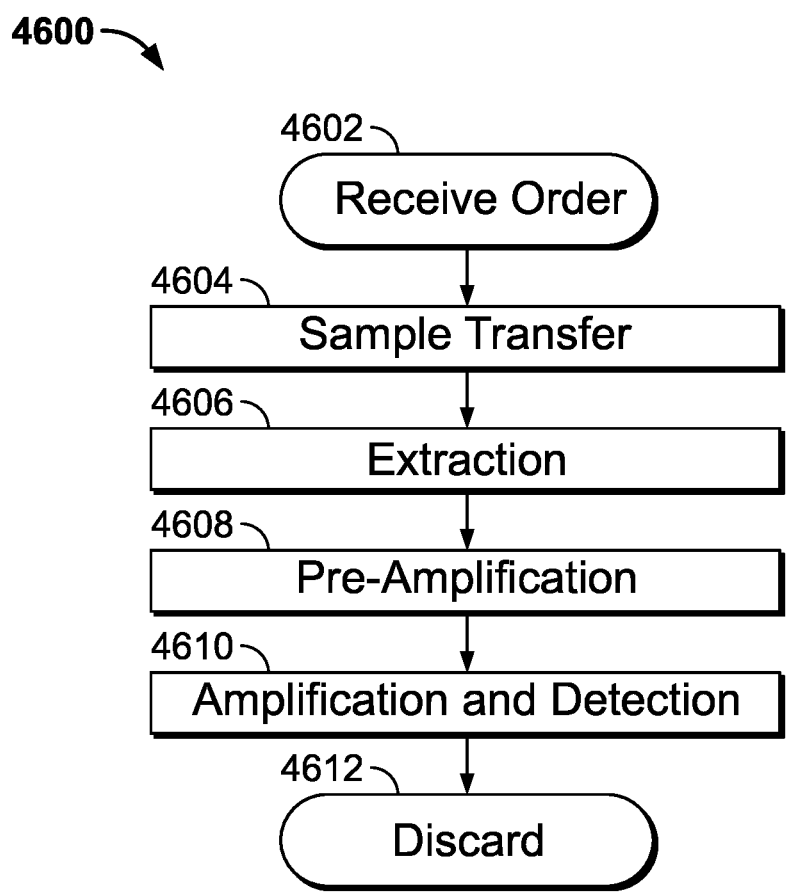
FIG. 16 is a flow diagram of a method of using the analyzer of FIG. 2 according to one embodiment of the present disclosure.

In a method 4600 of processing and analysis (FIG. 16) utilizing analyzer 4000, analyzer 4000 moves samples through four functional stages: sample transfer, extraction, pre-amplification, and amplification/detection. Such stages are now described.

Sample Transfer

Upon notification 4600 from pre-analytical system 10 that a batch of samples has been prepared (up to three shuttles 4030) and is ready for transfer and analyzer 4000 acknowledges such notification, analyzer 4000 advances to the sample transfer stage 4604. In the sample transfer stage, pre-analytical system 10 feeds shuttles 4030 to analyzer 4000 via shuttle transport assembly 300 in a sequence of one to three shuttles 4030. The size of the batches conveyed into the analyzer 4000 is a matter of design choice. For example, where three shuttles are transferred, the first two shuttles 4030 may contain 12 sample containers 03 and the last shuttle 4030 may contain 8 sample containers. The first shuttle will typically include 2 control sample containers numbering among the 12 sample containers carried thereby into the analyzer. The two control sample containers will typically be in the front of the shuttle as conveyed into the analyzer. Therefore, in this example, 30 sample containers are carried into analyzer in one batch, with two controls. These shuttles 4030 are handled one-at-a-time by analyzer 4000 such that the samples contained in the shuttle 4030 are completely moved through the sample transfer process and returned to pre-analytical system 10 before the next shuttle 4030 in the queue is moved to analyzer 4000.

Shuttle Receipt and Clamping

As described in the '349 application, shuttle transport assembly 300 of system 10 includes an input lane and an output lane wherein one of these is dedicated for shuttle transfer to analyzer 4000 and one for shuttle return from analyzer 4000. Prior to receipt of shuttle 4030 from pre-analytical system 10, analyzer 4000 ensures conveyor 4254 of shuttle retention assembly 4250 is aligned with the appropriate lane of shuttle transport assembly 300. Thereafter, shuttle 4030 is fed out of pre-analytical system 10, through a port between the side walls of the two systems 10, 4000, and onto conveyor 4254 within analyzer 4000. Thus, pre-analytical system 10 hands off a shuttle 4030 to analyzer 4000.

Once the shuttle 4030 has fully transitioned into analyzer 4000, pre-analytical system 10 ceases its feed mechanism and waits for a ready acknowledgement from analyzer 4000 to send a subsequent shuttle 4030. Meanwhile, analyzer 4000 moves shuttle 4030 to its dock position toward the center of analyzer 4000 until it is positioned between clamping assembly 4252. Once the shuttle 4030 has been registered as being in its desired location through the use of optical sensors, clamping assembly 4252 clamps about shuttle 4030 and engagement members 4253 engage skirts 07 of sample containers 03, such as by piercing them, to hold them in place for liquid transfer.

Thereafter, a pipette assembly 4380 penetrates a penetrable cap 09 of one of sample containers 03 in shuttle 4030. The geometry of the pierced cap creates the possibility of a significant amount of lift force being generated on container 03 by pipette assembly 4380 as the pipette tip 4062 is removed from container 03 following aspiration. Engagement members 4253 help ensure that each container 03 remains seated.

Sample Aspiration and Transfer

Once shuttle 4030 with its containers 03 are fully seated and secured, analyzer 4000 moves to the sample aspiration and transfer portion of the sample transfer stage 4604. For each set of four containers 03 in the shuttle 4030, beginning with the pair of containers 03 in the innermost position, pipettor 4350 uses two of its five pipette assemblies 4380 with a pipette tip 4062 loaded thereon to pierce penetrable cap 09 of each pair of containers 03, mix the sample, and aspirate the required sample volume from the containers 03. Once the correct sample volume has been aspirated, pipette tips 4062 are removed. A second pair of pipette assemblies 4380 is used to perform the identical process on the next pair of sample containers 03 in shuttle 4030 moving in a direction away from the center of shuttle 4030.

Once four samples are aspirated and are disposed within pipette tips 4062, multipurpose robot 4350 moves over to a pre-designated consumable drawer 4120 and dispenses the four samples in one row of the 4×8 grid of extraction containers 4026 which have been pre-punctured prior to the sample transfer process. Following dispensing of the samples into extraction containers 4026, the four used pipette tips 4062 are ejected through tip waste chute 4210. This process is repeated for the remaining two sets of four samples in shuttle 4030 (in the case of the third shuttle, the one remaining set of four), until the entire set of containers 03 contained in the particular shuttle 4030 have been transferred to extraction containers 4026.

Shuttle Return

Once samples from all containers 03 have been successfully transferred to extraction containers 4026, shuttle 4030 can be returned to pre-analytical system 10. To prepare for this, clamping mechanism 4252 on shuttle retention assembly 4250 is released, removing engagement members 4253 from containers 03 in shuttle 4030. Following negotiation of readiness between pre-analytical system 10 and analyzer 4000, shuttle retention assembly 4250 shifts itself in a forward-backward direction along platform 4255 so that its conveyor 4254 aligns itself with a sample return lane of shuttle transport assembly 300 in pre-analytical system 10. Once retention assembly 4250 is in position, conveyor 4254 is used to pass shuttle 4030 out of analyzer 4000 and back to pre-analytical system 10.

These steps are repeated until all three shuttles 4030 have been received by analyzer 4000, had their samples transferred to an extraction container 4026, and returned to pre-analytical system 10. At that point, the sample transfer stage 4604 is completed. Thus, in this embodiment, 32 tips have been consumed, and analyzer 4000 moves to the extraction stage 4606.

Extraction

Once all samples have been moved to the extraction containers 4026, analyzer 4000 begins extraction process 4606. During extraction, DNA is eluted from the samples and isolated to prepare for PCR amplification. Extraction stage 4606 is conducted using pipette assemblies 4380*a-e* on multifunctional robot 4300 and the extractors built into the particular consumable drawer 4120 on which extraction is being performed.

Pipettor Usage

In order to minimize the number of tips 4062 required to perform the assay workflow, multifunctional robot 4300 includes five pipette assemblies 4380*a-e*. This allows analyzer 4000 to sequester a single pipette assembly 4380 for clean reagent dispenses that do not make contact with the sample and, thus, do not contaminate the tip with sample. This fifth pipettor 4380 finds its use in the extraction protocol, reducing the frequency with which contaminated tips 4062 need to be disposed.

At some point prior to commencing extraction (either during a previous run if sufficient bulk liquid reagent remained in the trough 4052 or when preparing for the run in question), a reagent trough assembly 4050 is pierced with a puncture tool 4240, which is left in place to provide channel 4242 through which the reagent tip 4062 can aspirate liquid reagents. Puncture tool application is performed by gripper 4340 of multifunctional robot 4300, as is described in more detail above Extractors To help isolate the DNA that is extracted from the sample, it is bound to ferric oxide particles, which allows for their magnetic capture. This enables the DNA to be isolated from the rest of the unwanted sample, which can be washed away from the eluate using a wash buffer located in trough assembly 4050. In order to perform this isolation, a magnetic field is applied to extraction containers 4026. This is achieved through the use of an extractor module, which includes enough magnets to ensure that each row of extraction containers 4026 is neighbored by a magnet on both sides. Such magnets are selectively moved from a position below extraction containers 4026 to a position adjacent such containers. This applies the magnetic field which captures the bound DNA to a side of extraction containers 4026.

Extraction Protocol

Extraction is achieved through the systematic addition of various buffers, engagement and disengagement of extractor magnets housed in the consumable drawer and tip mixes. The full extraction operation generally involves the use of 2 pipette tips 4062 per sample and uses, in the following order, acid, wash, elution, and neutralization buffers. Analyzer 4000 processes sets of four samples at a time, allowed by the spacing of pipettors 4380. To start, the instrument extracts the DNA for a set of four samples using the acid, wash, and elution buffers and performing sample mixes using a single set of tips, at which point the neutralization buffer is added and analyzer 4000 moves to the next set of four samples. Once DNA has been eluted from all samples, analyzer 4000 uses a second set of four tips 4062 for each row of four samples to perform a neutralization mix (disposing of the tips after each mix), at which point the extracted DNA is ready for amplification and the instrument moves to the pre-amplification stage 4608.

Pre-Amplification

The pre-amplification stage 4608 occurs once DNA extraction is finished, and is responsible for taking the extracted DNA left in extraction containers 4026, using it to rehydrate a master mix reagent in an amplification plate 4040, preparing amplification plate 4040 for PCR, and moving plate 4040 to the appropriate reader 4260. This process is achieved through use of multifunctional robot 4300 (both pipettors 4380 and gripper 4340), the plate sealer 4220, and orbital mixer 4230.

Eluate Transfer

In order to move the eluted DNA from the extraction containers 4026 to amplification plate 4040, analyzer 4000 uses the sequestered/reserved pipette tip for each sample. Each of the 32 DNA samples is transferred into three wells 4042 in amplification plate 4040. This is accomplished through a triple dispense, wherein enough sample for all three dispenses is aspirated from four extraction containers 4026 at a time using four sample pipettors 4380. Following aspiration, robot 4300 moves over amplification plate 4040 and sequentially dispenses into each of the three wells 4042 that are filled by each sample. Following this dispense, three (predetermined) wells 4042 are filled with neutralized DNA elution each. The used tips 4062 are then dropped into waste 4210, and the process is repeated for the remaining seven rows of four extraction containers 4020.

Plate Sealing

Once the eluted DNA is transferred into amplification plate 4040, plate 4040 is moved to plate sealer 4220 where it is sealed. To transport plate 4040, robot 4300 is positioned such that gripper mechanism 4340 hovers over amplification plate 4040. Gripper arms 4344a-b are opened, gripper 4340 is lowered, and arms 4344a-b close to engage plate 4040. Sensors in the gripper arms 4344a-b indicate when gripper teeth have engaged plate 4040.

Once engaged, plate 4040 is lifted and transported by robot 4300 to plate sealer 4220. Plate 4040 is deposited in the waiting stage 4224 of sealer 4220, arms 4344a-b disengage, and gripper 4340 is cleared vertically. To apply the plate seal, sealer 4220 positions amplification plate 4040 under a heated platen, feeds a section of cut seal material over plate 4040, and lowers the platen to use heat and pressure to bond the seal material to plate 4040. After sealing, the stage 4224 is ejected and plate 4040 is available for transport.

Plate Mixing

Once plate 4040 has been sealed, rehydration of the master mix dry-down reagent within amplification plate 4040 is performed. Once again, plate gripper module 4340 of robot 4300 engages and lifts plate 4040, and transports it to a pre-selected orbital mixer 4230. Once plate 4040 has been placed in mixer 4230, gripper arms engage to lock the plate in place. To finalize rehydration, plate 4040 is spun at a speed that ensures full mixing of the eluate and dry-down reagent while avoiding splashing of the liquid onto the plate seal.

Transfer to Reader

Once the plate 4040 has been fully processed for PCR amplification, it is transported into reader 4260 for amplification. To ready reader 4260 to accept plate 4040, the reader cavity is opened and any plate 4040 held in the reader is moved to waste 4004 using plate transfer module 4320 on robot 4300. Robot 4300 then retrieves the released plate 4040 from mixer 4230 and moves it to pre-selected reader 4260. Once plate 4040 has been placed in reader 4260, amplification and detection can begin.

Amplification and Detection

Once plate 4040 has been placed in reader 4260, analyzer control software, via processor 4412, initiates a PCR protocol which allows reader 4260 to amplify the sample in place, monitor its real-time amplification, and return curve data that can be translated into a result on each of the molecular assay targets, in turn allowing for detection and genotyping of HPV.

Assay Timing

The PCR protocol takes approximately 2 hours after initiation to complete. To maximize throughput, analyzer 4000 leverages the difference in the extraction (~1 hr.) and amplification/detection (~2 hr.) processes. Once a sample has been placed in reader 4260 and the amplification and detection stage 4610 has begun, a second set of samples can begin to move through the process. These samples will be fed into the second reader 4260b; starting PCR approximately 1 hour after the protocol in the first reader 4260a starts. A third set of samples can then be moved through the extraction process, finishing in time to be placed in first reader 4260a for PCR, which has recently finished its first amplification. By alternating samples between the two readers 4260a-b, it is possible to maximize the number of samples moved through the extraction process.

A number of consumables are loaded on either a per-run or per-day basis by the user to ensure full assay throughput. In one embodiment, consumable drawers 4100 in analyzer 4000 provide a platform on which samples 03 are processed and DNA is extracted. Each of these is used one-at-a-time, meaning that at any point, several are not in use (and either in a loaded or consumed state). Analyzer 4000 is setup, via instructions 4416 in its memory 4414, such that these drawers 4100 can be ejected and accessed without requiring the user to access the internal envelope of analyzer 4000 and halt the movement of robot 4300. At any point in time, a visual indicator (e.g., colored LED) on each drawer 4110, 4120 indicates its status (ready for use, in-use, spent). The user can access all drawers 4100 that are not currently in use at any point in time, so that all spent drawers can be replenished at the convenience of the user.

When each drawer 4120 is ejected, the user removes and replaces the used amplification container holders 4020 and empty tip holders 4060. The user also adds an unused amplification plate 4040 to drawer 4120. Once drawer 4120 is reinserted, the instrument re-inventories that particular drawer 4120 to check for loading errors and to update its internal inventory, flagging the drawer as ready for an extraction.

Extraction Trough Reloading

Extraction trough assemblies 4050 contain sufficient liquid reagent for about 18 extractions, which is enough to last for a full 24 hour period at a maximum throughput. As it may be unknown how much throughput may be needed for a particular day, two reagent trough assemblies 4050 sit on the deck rather than one large trough assembly. This allows each trough to be fully consumed prior to using the second trough, minimizing waste. Since such troughs can last a 24 hour period, such troughs 4050 are typically reloaded during a daily cleaning protocol. During operation, analyzer 4000 monitors volume and indicates to the user which, if any, troughs 4050 may need to be replaced.

One example of what is described herein is an automated analyzer having: i) a processing deck comprising a shuttle transfer station, the shuttle transfer station further comprising a conveyer for carrying a shuttle received by the automated analyzer to the shuttle transfer station, the shuttle being a rack comprising a plurality of receptacles, each receptacle adapted to receive a sample container; ii) a carrier for at least one puncture tool disposed on the processing deck; iii) a robot comprising a gripper; iv) a station configured to receive a consumable reagent trough. In this example, the robot, using the gripper, moves a puncture tool from the carrier to the station that receives a consumable reagent trough and lowers the puncture tool over the station configured to receive a consumable reagent trough. In one example the robot is a multipurpose robot having: i) a gantry; and ii) a payload moveably connected to the gantry, the payload carrying the gripper and a pipettor module having a plurality of pipette heads each being connectable to a pipette tip. The gripper has a plurality of moveable arms capable of cooperative lateral movement to grasp and release articles. The robot also has a backplane connector having a housing and a plurality of utility connectors coupled to the housing. The pipettor module and gripper are each connected to the housing of the backplane connector and the plurality of utility connectors thereof in this example.

The above puncture tool carrier has a housing defining a cavity dimensioned to receive a puncture tool and a plurality of retaining members moveably connected to the housing. The plurality of retaining members are moveable from a first position in which the retaining members engage the puncture tool when present in the puncture tool carrier to a second position in which the retaining members are disengaged from the puncture tool allowing the puncture tool to be placed in and removed from the carrier. In one example the puncture tool carrier includes a plurality of posts extending from a base of the housing. The posts may be tapered at the distal end of the post from the base.

In one example, the gripper has at least two gripper arms. Each of the at least two gripper arms has a gripper finger attached thereto, where the gripper arms move laterally with respect to each other such that in a first position the gripper arms are spaced a lateral distance apart that is greater than the lateral spaced apart distance in a second position. In a further example the gripper has at least two holding members. For example, each of the at least two holding members moves laterally with respect to each other such that in a first position the holding members are spaced a lateral distance apart that is greater than the lateral spaced apart distance in a second position.

In a further example, the at least two gripper fingers and/or the at least two holding members each have a projection. In one example when the gripper is placed into the carrier, the gripper fingers engage and are biased against the retaining members when the gripper fingers are in the first position and do not engage the retaining members when in the second position.

In one example, the puncture tool has a tool body and a plurality of cannulated puncture members extending from the tool body, the cannulated puncture members each defining an opening extending through the tool body and each being sized to allow a pipette tip to pass therethrough, each cannulated puncture member also defining an edge configured to penetrate a penetrable lid. The puncture tool comprises openings that are configured to receive the posts when the puncture tool is placed in the carrier.

In a further example the shuttle transfer station has a shuttle retaining platform that includes a jaw assembly with an open position and a closed position, the jaw assembly being in the open position when the shuttle is received in the shuttle retaining platform. The jaw assembly also has engagement projections. When the jaw assembly is in the closed position, the engagement projections secure against lower portions of containers carried by the shuttle. The jaw assembly is configured for the engagement projections to pass through openings in the side of a shuttle received by the shuttle retaining platform when the jaw is in the closed position thereby urging the engagement projections into contact with the lower portions of sample containers disposed in the shuttle. The engagement projections do not extend into the shuttle openings when the jaw is in the open position. In a further example the jaw assembly has a drip shield that fastens around sample containers disposed in the shuttle when the jaws are in the closed position. In a further example the shuttle retaining platform has an input lane and an output lane and the shuttle retaining platform receives the shuttle in the output lane and the shuttle retaining platform is equipped with a driver that moves the jaw assembly with the shuttle therein from the output belt to the input belt.

Also described herein is an extraction container holder assembly with: i) a bottom tray comprising an array of openings; ii) a top tray having an array of openings. When the bottom tray and the top tray are assembled together, the bottom openings align with the top openings. The assembly includes an array of extraction tubes joined together as a strip. When the strip of extraction tubes is assembled with the bottom tray, the extraction tubes fit through the openings in the bottom tray and the strip prevents the tubes from passing through the openings so that the strip rests on the top of the bottom tray. In one example there is a layer disposed over the strip and the array of extraction tubes supported by the strip, and the layer formed over the extraction tubes is a seal and wherein the seal is a pierceable seal. In a further example the bottom tray has upward facing sidewalls and, when the top tray is assembled with the bottom tray, the top tray fits within the confines of the upward facing side walls of the bottom tray. The top tray of the assembly may have support ribs that are positioned on the top try in a direction that is orthogonal to the strip supported by the bottom tray. The seals over the extraction tubes are exposed through the openings in the top tray when the top and bottom trays are assembled together with the strip therebetween. In a further example a barcode is placed on the top tray, wherein the information associated with the bar code includes at least one of a manufacturing lot of the extraction tubes, an expiration date of the extraction tubes or serial number of the extraction tubes. In a further example the bottom tray has a feature on the upwardly extending sidewalls thereon that engages with a corresponding feature in a drawer for housing the extraction container assembly providing for an interference of the extraction tube container assembly in the drawer.

Also described herein is a puncture tool assembly having: i) a puncture tool having a tool body and a plurality of cannulated puncture members extending from the tool body, the cannulated puncture members each defining an opening extending through the tool body and each being sized to allow a pipette tip to pass therethrough, each cannulated puncture member also defining an edge configured to penetrate a penetrable lid and where each of the troughs is covered by the penetrable lid prior to being penetrated by respective cannulated puncture members; and ii) a puncture tool carrier having a housing defining a cavity dimensioned to receive the puncture tool and a plurality of retaining members moveably connected to the housing, the plurality of retaining members being moveable from a first position in which the retaining members engage the puncture tool to a second position in which the retaining members are disengaged from the puncture tool. The puncture tool carrier may have a plurality of posts extending from a base of the housing. The posts may be tapered at the distal end of the post from the base.

Also described herein is a multipurpose robot having: i) a gantry; and ii) a payload moveably connected to the gantry. The payload has: i) a pipettor module having a plurality of pipette heads each being connectable to a pipette tip; ii) a gripper module having a plurality of moveable arms for gripping consumable items; and iii) a backplane connector having a housing and a plurality of utility connectors coupled to the housing, the utility connectors being configured to supply at least one of power, data or vacuum pressure to the payload and the pipettor module and gripper module are each connected to the housing of the backplane connector and the plurality of utility connectors thereof. In one example the gripper has at least two gripper arms, each of the at least two gripper arm having gripper finger attached thereto. The gripper arms move laterally with respect to each other such that in a first position the gripper arms are spaced a lateral distance apart that is greater than the lateral spaced apart distance in a second position. The gripper may have a plurality of holding members. In this example the at least two holding members move laterally with respect to each other such that in a first position the holding members are spaced a lateral distance apart that is greater than the lateral spaced apart distance in a second position. In a further example the at least two gripper fingers and/or the at least two holding members each has a projection.

Also described is a method of obtaining reagents for an assay in an automated analyzer, in which the following steps are performed: i) moving a robot payload to a puncture tool carrier in which is disposed a puncture tool, the robot payload carrying a pipettor module and a gripper module, the gripper module having at least two gripper arms, each gripper arm comprising a holding member and a finger; ii) engaging projections from the holding member of the gripper arm with a corresponding linking member of the puncture tool by moving the gripper arms from a first position to a second position; iii) moving the robot carrying the puncture tool to a liquid container at a second location, the liquid container having one or more penetrable lids covering a plurality of compartments containing liquid reagents; iv) lowering the puncture tool onto the liquid container so that cannulated puncture members extending from the puncture tool penetrate the one or more lids of the liquid container and each cannulated puncture member enters a different compartment of the liquid container; v) releasing the puncture tool from the robot by translating the gripper arms inward and closer together so that the projections withdraw from the linking member of the puncture tool; vi) introducing a pipette tip of the pipettor module through at least one of the cannulated puncture members and into contact with the liquid reagent disposed in the compartment penetrated by the puncture member; vii) aspirating a liquid reagent from the compartment; and viii) transferring the liquid reagent to a tube adapted to receive a sample for analysis. In the method a respective pipette tip may be introduced through each cannulated puncture member and into contact with liquid reagents in the compartment punctured by the respective puncture member.

In another exemplary method for obtaining a sample for analysis, such method includes the steps of: i) conveying a first shuttle carrying one or more sample containers into a sample analyzer and into a shuttle retaining mechanism, the shuttle retaining mechanism having opposed arms disposed along the sides of the shuttle conveyed therein; ii) moving the opposed arms from a first position in which the shuttle was received to a second position wherein, in the second position, engagement members extending from each opposed arm engages a bottom portion of each sample container disposed in the shuttle such that the engagement members extend through openings in the shuttle when in the second position; iii) lowering a pipette tip through the sample cap of the container, thereby piercing a seal in the cap, the pipette tip extending into the sample disposed in the sample container; iv) aspirating a sample from the sample container of the first shuttle with the pipettor; v) withdrawing the pipette tip from the sample containers; the engagement members remaining engaged with the bottom portion of each sample container as the pipette is withdrawn; vi) moving the opposed arms from the second position back to the first position; and vii) conveying the first shuttle away from the shuttle retaining mechanism in a second direction opposite the first direction. In such method the following additional steps may be performed: viii) moving the shuttle laterally from a first lane through which the shuttle is advanced into the shuttle retaining mechanism to a second lane through which the shuttle is conveyed out of the analyzer.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An extraction container holder assembly comprising:
   a lower tray portion comprising an array of openings;
   an upper tray portion comprising an array of openings; wherein, when the lower tray portion and the upper tray portion are assembled together, the openings in the lower tray portion align with the openings in the upper tray portion;
   an array of extraction tubes joined together by a strip, each extraction tube having an open end and a closed end, wherein the strip joins the open ends of each extraction tube, wherein, when the strip of extraction tubes is assembled with the lower tray portion, the extraction tubes fit through the openings in the lower tray portion and the strip prevents the extraction tubes from passing through the openings in the lower tray portion so that the strip rests on and is supported by the lower tray portion,
   further comprising a continuous layer disposed over the strip and the array of extraction tubes joined together by the strip, the layer disposed below the upper tray portion, wherein the layer formed over the extraction tubes is a seal and wherein the seal is a pierceable seal.

2. The extraction container holder assembly of claim 1, wherein the lower tray portion further comprises upward facing sidewalls and wherein, when the upper tray portion is assembled with the lower tray portion, the upper tray portion fits within the upward facing side walls of the lower tray portion.

3. The extraction container holder assembly of claim 1, wherein the upper tray portion has support ribs that are positioned on the upper tray portion in a direction that is orthogonal to the strip supported by the lower tray portion.

4. The extraction container holder assembly of claim 1, wherein the seal over the extraction tubes is exposed through the openings in the upper tray portion when the upper and lower tray portions are assembled together with the strip therebetween.

5. The extraction container holder assembly of claim 1, wherein a barcode is placed on the upper tray portion, wherein information associated with the bar code includes at least one of a manufacturing lot of the extraction tubes, an expiration date of the extraction tubes or a serial number of the extraction tubes.

6. The extraction container holder assembly of claim 2, wherein the lower tray portion has a feature on the upward facing sidewalls thereon that engages with a corresponding feature in a drawer for housing the extraction container holder assembly providing for an interference of the extraction container holder assembly in the drawer.

7. The extraction container holder assembly of claim 1, wherein the strip is flush with the open ends of each extraction tube.

8. The extraction container holder assembly of claim 1, wherein the strip of extraction tubes is configured such that, when the extraction container holder assembly is assembled, the extraction tube openings are between the lower tray openings and the upper tray openings and the extraction tubes do not extend into or through the openings in the upper tray portion.

\* \* \* \* \*